United States Patent
Sappenfield

(10) Patent No.: US 12,257,115 B2
(45) Date of Patent: Mar. 25, 2025

(54) DEVICES AND ROTATIONAL COMPONENTS THEREOF AND RELATED METHODS

(71) Applicant: Christopher C Sappenfield, Goodyear, AZ (US)

(72) Inventor: Christopher C Sappenfield, Goodyear, AZ (US)

(73) Assignee: AIVIA TECHNOLOGIES, INC., Goodyear, AZ (US)

( * ) Notice: Subject to any disclaimer, the term of this patent is extended or adjusted under 35 U.S.C. 154(b) by 0 days.

(21) Appl. No.: 18/513,578

(22) PCT Filed: May 23, 2023

(86) PCT No.: PCT/US2023/023172
§ 371 (c)(1),
(2) Date: Nov. 19, 2023

(87) PCT Pub. No.: WO2023/230021
PCT Pub. Date: Nov. 30, 2023

(65) Prior Publication Data
US 2024/0415621 A1  Dec. 19, 2024

Related U.S. Application Data

(60) Provisional application No. 63/357,659, filed on Jul. 1, 2022, provisional application No. 63/345,421, filed on May 24, 2022.

(51) Int. Cl.
*A61C 17/22* (2006.01)
*A61C 3/025* (2006.01)
*A61C 17/26* (2006.01)
*A61C 17/34* (2006.01)

(52) U.S. Cl.
CPC ............ *A61C 17/222* (2013.01); *A61C 3/025* (2013.01); *A61C 17/225* (2013.01); *A61C 17/26* (2013.01); *A61C 17/3436* (2013.01)

(58) Field of Classification Search
CPC ..... A61C 17/222; A61C 3/025; A61C 17/225; A61C 17/26; A61C 17/3436
See application file for complete search history.

(56) References Cited

U.S. PATENT DOCUMENTS

| | | | |
|---|---|---|---|
| 4,274,173 A | 6/1981 | Cohen | |
| 4,810,237 A | 3/1989 | Mantovaara | |
| 5,920,939 A | 7/1999 | Worwag | |
| 9,408,680 B2 * | 8/2016 | Diamond | A61C 17/26 |
| 2008/0256743 A1 | 10/2008 | Lam | |
| 2013/0055515 A1 | 3/2013 | Diamond et al. | |
| 2018/0311023 A1 | 11/2018 | Yao | |

OTHER PUBLICATIONS

Rodriquez, K. (Authorized officer), International Search Report and Written Opinion in corresponding International Application No. PCT/US23/23172 mailed on Sep. 26, 2023, 20 pages.

* cited by examiner

*Primary Examiner* — Shay Karls
(74) *Attorney, Agent, or Firm* — Christopher C. Sappenfield

(57) ABSTRACT

Devices and head components that include a band component and one or more rotational components are provided. Devices and head components that include one or more fluid driven rotational components are provided. Related methods are also provided.

20 Claims, 17 Drawing Sheets

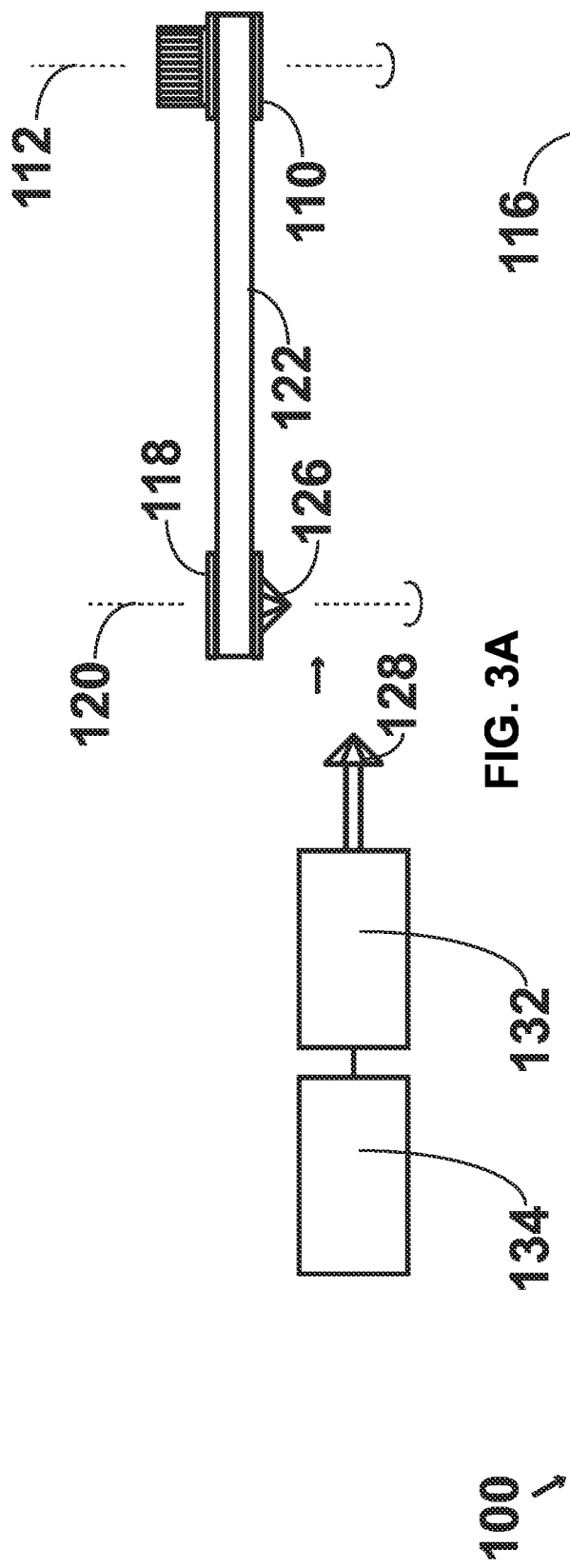
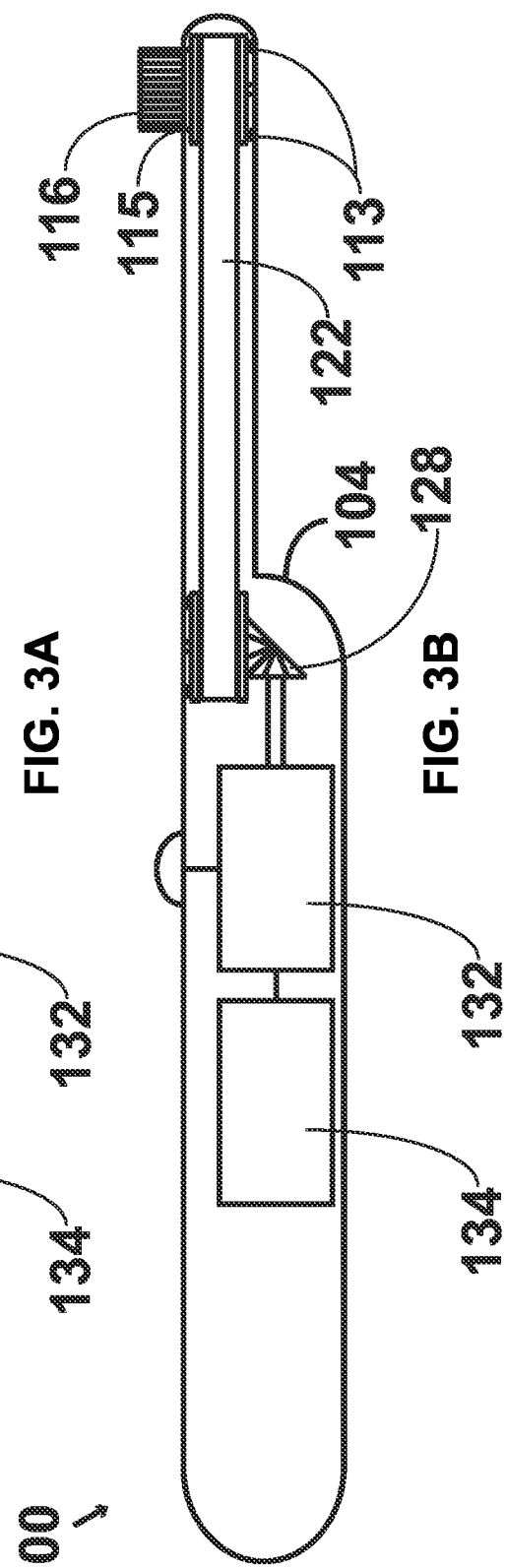
FIG. 3A
FIG. 3B

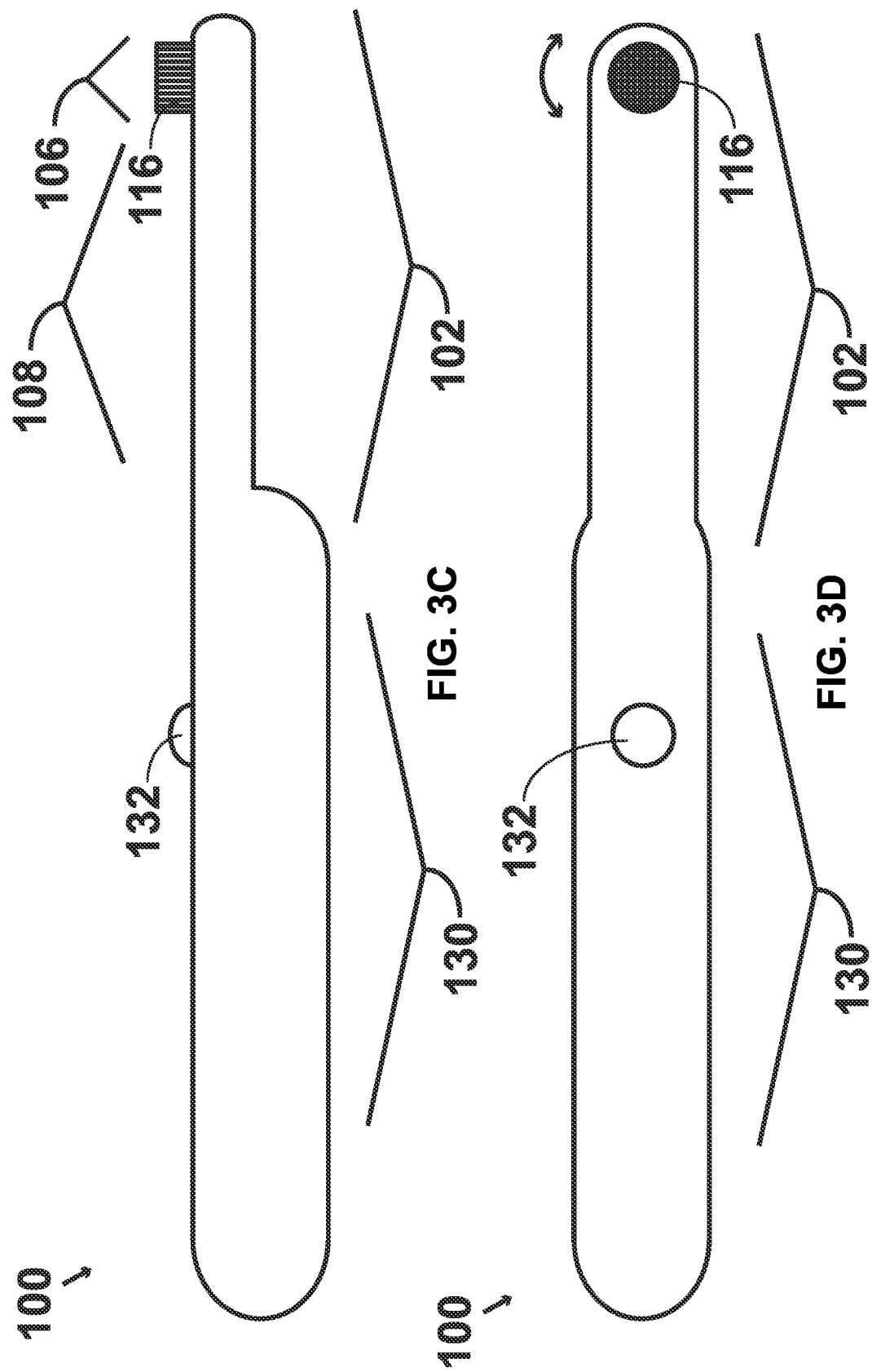

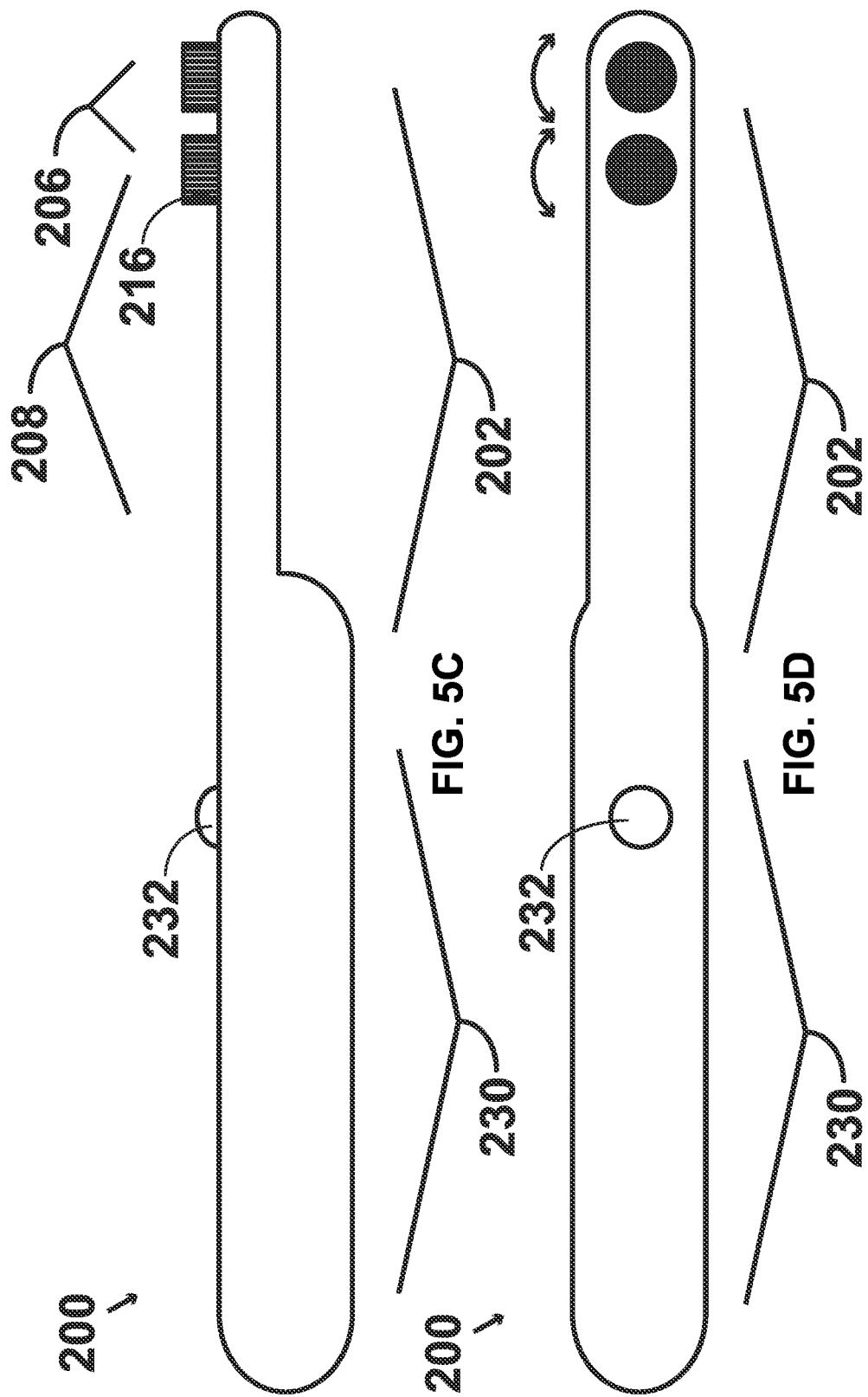

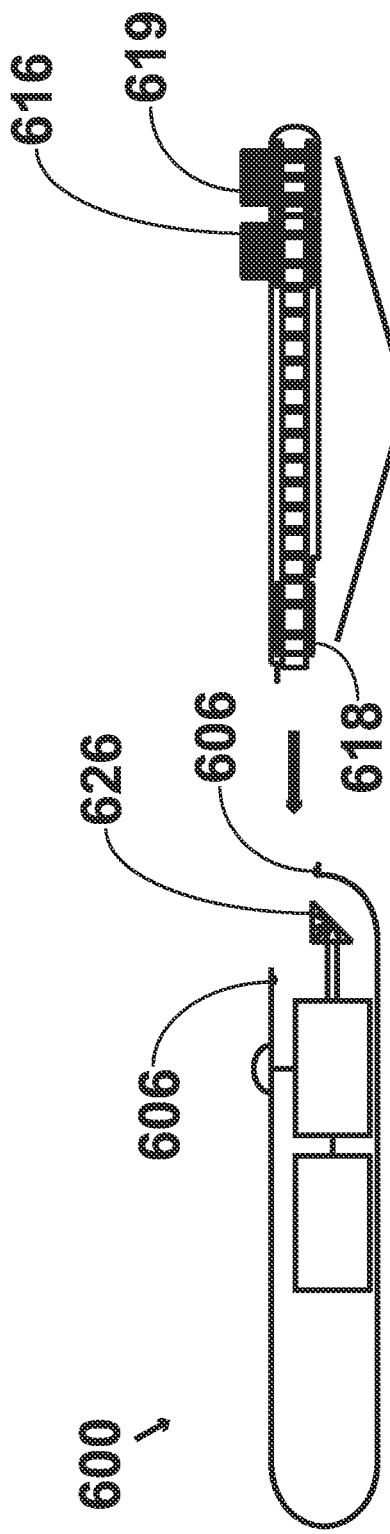
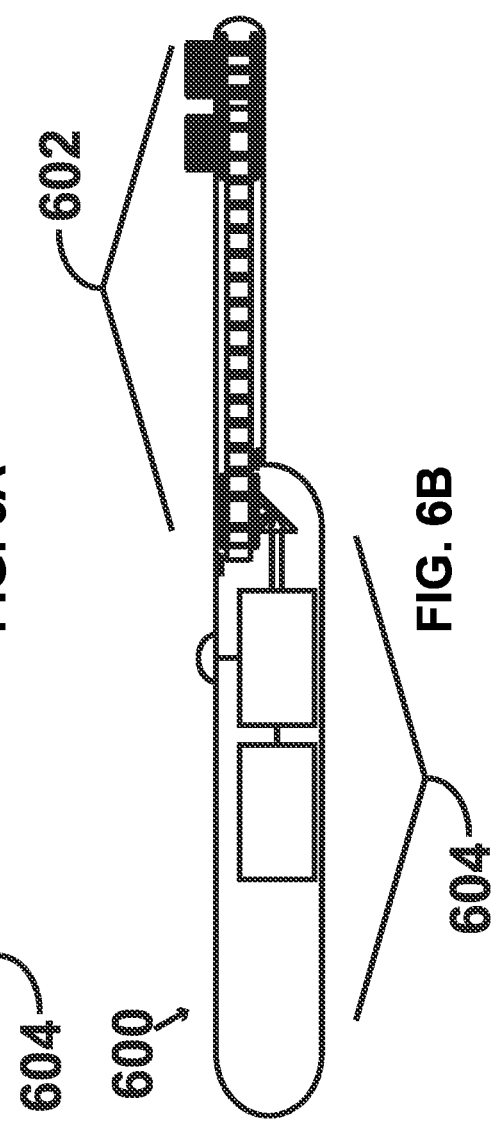
FIG. 6A
FIG. 6B

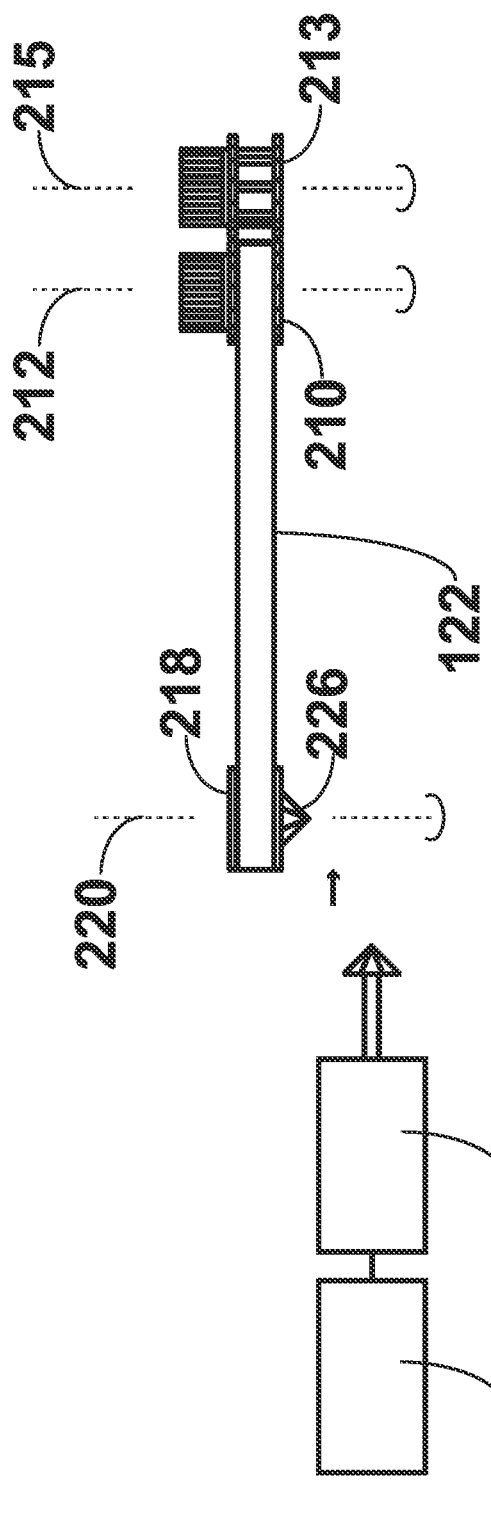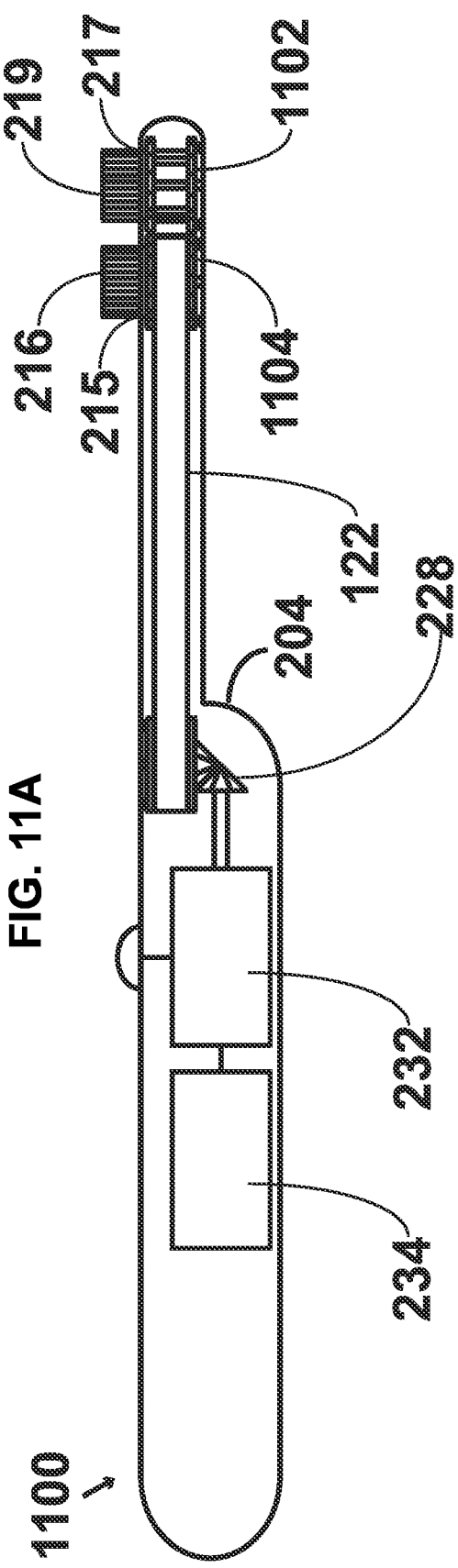
FIG. 11A
FIG. 11B

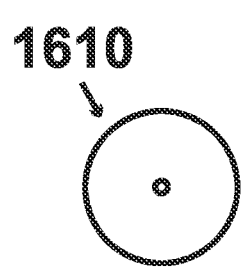 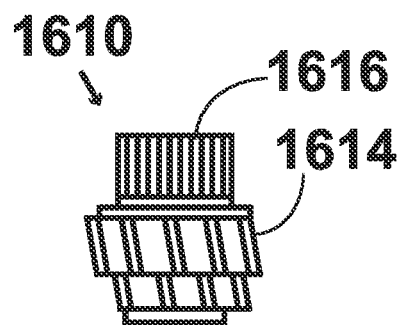 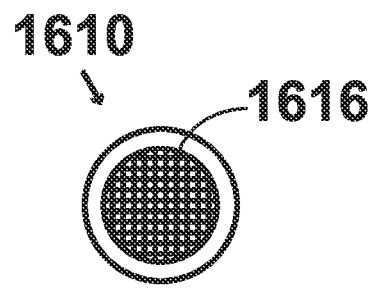
FIG. 16A  FIG. 16B  FIG. 16C
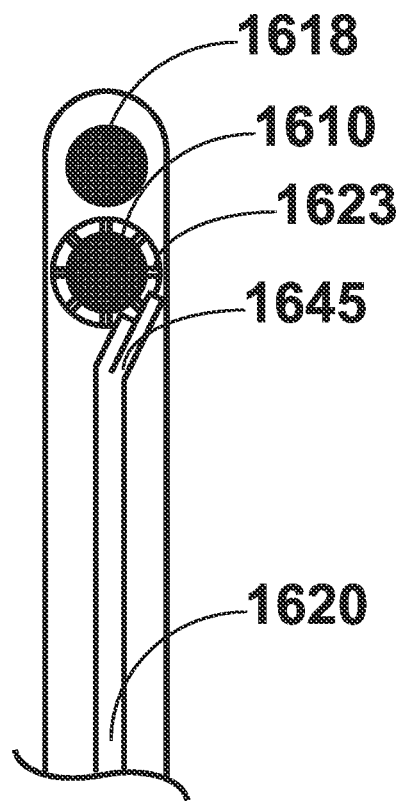
FIG. 17

DEVICES AND ROTATIONAL COMPONENTS THEREOF AND RELATED METHODS

CROSS-REFERENCE TO RELATED APPLICATIONS

This application is the national stage entry of International Patent Application No. PCT/US23/23172, filed on May 23, 2023, which claims the benefit of and priority to U.S. Provisional Patent Application Ser. Nos. 63/357,659, filed Jul. 1, 2022 and 63/345,421, filed May 24, 2022, the disclosures of which are incorporated herein by reference.

FIELD OF THE INVENTION

The invention relates generally to electromechanical devices, and provides dental devices and related components in certain embodiments.

BACKGROUND OF THE INVENTION

Devices that carry out electrical operations using moving parts are typically referred to as electromechanical devices. These generally include devices which involve an electrical signal to create mechanical movement, or mechanical movement to create an electric signal. Often involving electromagnetic principles such as in relays, which allow a voltage or current to control other, usually isolated circuit voltage or current by mechanically switching sets of contacts, and solenoids, by which a voltage can actuate a moving linkage as in solenoid valves. To further illustrate, piezoelectric devices are electromechanical, but do not use electromagnetic principles. Instead, piezoelectric devices can create sound or vibration from an electrical signal or create an electrical signal from sound or mechanical vibration. Electromechanical devices have myriad uses or applications, include in household or industrial cleaning applications and in dental applications, among numerous other examples.

SUMMARY OF THE INVENTION

In one aspect, the present disclosure provides a device (e.g., an electric toothbrush, a dental hygienist's cleaning, polishing device (e.g., a device comprising a prophy arm or angle), a scrubbing device, a sanding device, a household cleaning device, an industrial cleaning device, etc.) that includes a head component that comprises a head housing component comprising a head portion and a neck portion that are operably connected to one another, wherein the head portion comprises at least a top area that comprises at least a first top opening. The head component also includes a first head portion rotational component operably disposed at least partially in the head portion of the head housing component, wherein the first head portion rotational component is configured to rotate completely around a first head portion rotational axis, wherein the first head portion rotational component comprises at least a first implement, and wherein at least a segment of the first head portion rotational component extends at least partially into and/or through the first top opening of the head portion such that the first implement at least partially extends from the head portion. The head component also includes a first neck portion rotational component operably disposed at least proximal to the neck portion of the head housing component, wherein the first neck portion rotational component is configured to rotate completely around a first neck portion rotational axis, and a band component operably engaged with the first head portion rotational component and the first neck portion rotational component such that when the first neck portion rotational component rotates in a first direction, the band component and the first head portion rotational component rotate in the first direction or when the first neck portion rotational component rotates in a second direction, the band component and the first head portion rotational component rotate in the second direction. In addition, the head component also includes a rotational mechanism operably connected, or reversibly connectable, to the first neck portion rotational component. The device also includes a handle component operably connected, or connectable, to the head component, which handle component comprises a handle housing component that comprises a motor component operably connected, or reversibly connectable, to a power source and to the rotational mechanism such that when the motor component effects rotation of the rotational mechanism, the first neck portion rotational component, the first head portion rotational component, and the band component rotate in the first direction or in the second direction when the rotational mechanism is operably connected to the first neck portion rotational component.

In another aspect, the present disclosure provides a device that includes a head component that comprises a head housing component comprising a head portion and a neck portion that are operably connected to one another, wherein the head portion comprises at least a top area that comprises at least a first top opening, and a first head portion rotational component operably disposed at least partially in the head portion of the head housing component, wherein the first head portion rotational component is configured to rotate completely around a first head portion rotational axis, wherein the first head portion rotational component comprises at least a first head portion gear component and at least a first implement that are operably connected to one another, and wherein at least a segment of the first head portion rotational component extends at least partially into and/or through the first top opening of the head portion such that the first implement at least partially extends from the head portion. The head component also includes a first neck portion rotational component operably disposed at least proximal to the neck portion of the head housing component, wherein the first neck portion rotational component is configured to rotate completely around a first neck portion rotational axis, wherein the first neck portion rotational component comprises at least a first neck portion gear component, a band component operably engaged with the first head portion gear component of the first head portion rotational component and the first neck portion gear component of the first neck portion rotational component such that when the first neck portion rotational component rotates in a first direction, the band component and the first head portion rotational component rotate in the first direction or when the first neck portion rotational component rotates in a second direction, the band component and the first head portion rotational component rotate in the second direction, a second gear component (e.g., a bevel gear component, a spur gear component, etc.) operably connected, or reversibly connectable, to the first neck portion rotational component, and a third gear component (e.g., a bevel gear component, a spur gear component, etc.) operably connected, or reversibly connectable, to the second gear component. The device also includes a handle component operably connected, or connectable, to the head component, which handle component comprises a motor component operably connected, or reversibly connectable, to a power source and to the third gear component such that when the motor component effects rotation of the third gear component, the second gear component, the first neck portion rotational component, the first head portion rotational component, and the band component rotate in the first direction or in the second direction when the third gear component is operably connected to the second gear component and when the second gear component is operably connected to the first neck portion rotational component.

In some embodiments, the first head portion rotational component comprises at least a first head portion gear component operably connected to the first implement; the first neck portion rotational component comprises at least a first neck portion gear component; the band component is operably engaged with the first head portion gear component of the first head portion rotational component and the first neck portion gear component of the first neck portion rotational component such that when the first neck portion rotational component rotates in the first direction, the band component and the first head portion rotational component rotate in the first direction or when the first neck portion rotational component rotates in the second direction, the band component and the first head portion rotational component rotate in the second direction; a second gear component is operably connected, or reversibly connectable, to the first neck portion rotational component; a third gear component is operably connected, or reversibly connectable, to the second gear component; and the motor component is operably connected, or reversibly connectable, to the power source and to the third gear component such that when the motor component effects rotation of the third gear component, the second gear component, the first neck portion rotational component, the first head portion rotational component, and the band component rotate in the first direction or in the second direction when the third gear component is operably connected to the second gear component and when the second gear component is operably connected to the first neck portion rotational component. In some embodiments, the first head portion rotational component and the first neck portion rotational component each comprise a pulley component. In some embodiments, the head component comprises at least one channel at least partially disposed within the head housing component and wherein at least a portion of the band component is disposed at least partially within the channel and is configured to move through the channel. In some embodiments, the head component comprises at least two channels at least partially disposed within the head housing component and wherein the band component is disposed at least partially within the channels and is configured to move through the channels. In some embodiments, the head component comprises at least one support structure disposed at least partially within the head housing component. In some embodiments, the support structure is disposed at least partially between the channels.

In some embodiments, the band component comprises a plurality of at least partially spherical or substantially disk-shaped projections. In some embodiments, the first head portion rotational component and the first neck portion rotational component each comprise spherical or substantially disk-shaped projection receiving areas that are structured to receive at least portions of the spherical or substantially disk-shaped projections such that when the first neck portion rotational component rotates in a first direction, the band component and the first head portion rotational component rotate in the first direction or when the first neck portion rotational component rotates in a second direction, the band component and the first head portion rotational component rotate in the second direction when the spherical or substantially disk-shaped projection receiving areas receive at least the portions of the spherical or substantially disk-shaped projections and at least the spherical or substantially disk-shaped projections engage the first head portion rotational component and the first neck portion rotational component. In some embodiments, the top area of the head component further comprises at least a second top opening, wherein a second head portion rotational component is operably disposed at least partially in the head portion of the head housing component, wherein the second head portion rotational component is configured to rotate completely around a second rotational axis, wherein the second head portion rotational component comprises at least a second implement, wherein at least a segment of the second head portion rotational component extends at least partially into and/or through the second top opening of the head portion such that the second implement at least partially extends from the head portion, and wherein the band component is further operably engaged with the second head portion rotational component and/or the first and second head portion rotational components operably engage one another such that when the first neck portion rotational component rotates in the first direction, the band component and the first head portion rotational component rotate in the first direction and the second head portion rotational component rotates in the second direction or when the first neck portion rotational component rotates in the second direction, the band component and the first head portion rotational component rotate in the second direction and the second head portion rotational component rotates in the first direction. In some embodiments, the second head portion rotational component comprises a pulley component. In some embodiments, the first and second head portion rotational components and the first neck portion rotational component each comprise spherical or substantially disk-shaped projection receiving areas that are structured to receive at least portions of the spherical or substantially disk-shaped projections such that when the first neck portion rotational component rotates in a first direction, the band component and the first head portion rotational component rotate in the first direction and the second head portion rotational component rotates in the second direction or when the first neck portion rotational component rotates in a second direction, the band component and the first head portion rotational component rotate in the second direction and the second head portion rotational component rotates in the first direction when the spherical or substantially disk-shaped projection receiving areas receive at least the portions of the spherical or substantially disk-shaped projections and at least the spherical or substantially disk-shaped projections engage the first and second head portion rotational components and the first neck portion rotational component. In some embodiments, the first and second head portion rotational components each comprise gear structures that mesh with one another when the first and second head portion rotational components rotate relative to one another.

In some embodiments, the head component and the handle component are fabricated integral with one another. In some embodiments, the head component is reversibly connectable to the handle component. In some embodiments, a first surface of the band component comprises a first set of projections that engage with the first head portion gear component of the first head portion rotational component and the first neck portion gear component of the first neck portion rotational component. In some embodiments, the top area of the head component further comprises at least a second top opening, wherein a second head portion rotational component is operably disposed at least partially in the head portion of the head housing component, wherein the second head portion rotational component is configured to rotate completely around a second rotational axis, wherein the second head portion rotational component comprises at least a second head portion gear component and at least a second implement that are operably connected to one another, wherein at least a segment of the second head portion rotational component extends at least partially into and/or through the second top opening of the head portion such that the second implement at least partially extends from the head portion, and wherein the band component is further operably engaged with the second head portion gear component and the first head portion gear component and/or the first and second head portion rotational components operably engage one another such that when the first neck portion rotational component rotates in the first direction, the band component and the first head portion rotational component rotate in the first direction and the second head portion rotational component rotates in the second direction or when the first neck portion rotational component rotates in the second direction, the band component and the first head portion rotational component rotate in the second direction and the second head portion rotational component rotates in the first direction. In some embodiments, the first direction and the second direction are substantially opposite one another. In some embodiments, a first surface of the band component comprises a first set of projections that engage with the first head portion gear component of the first head portion rotational component and the first neck portion gear component of the first neck portion rotational component and wherein a second surface of the band component comprises a second set of projections that engage with the second head portion gear component of the second head portion rotational component. In some embodiments, the first head portion rotational component and/or the second head portion rotational component comprises at least one resilient coupling component that resiliently couples the first implement directly or indirectly to the first head portion gear component and/or the second implement directly or indirectly to the second head portion gear component. In some embodiments, the device comprises a dental device. In some embodiments, the dental device comprises a toothbrush (e.g., an electric toothbrush). In some embodiments, the first implement and the second implement are independently selected from the group consisting of: a prophy cup, a bristle component, a flossing component, a polishing component, and a combination of two or more thereof. In some embodiments, the first implement and the second implement are independently selected from the group consisting of: a cleaning component, a polishing component, a sanding component, and a scrubbing component.

In another aspect, the present disclosure provides a head component that includes a head housing component comprising a head portion and a neck portion that are operably connected to one another, wherein the head portion comprises at least a top area that comprises at least a first top opening, and a first head portion rotational component operably disposed at least partially in the head portion of the head housing component, wherein the first head portion rotational component is configured to rotate completely around a first head portion rotational axis, wherein the first head portion rotational component comprises at least a first head portion gear component and at least a first implement, and wherein at least a segment of the first head portion rotational component extends at least partially into and/or through the first top opening of the head portion such that the first implement at least partially extends from the head portion. The head component also includes a first neck portion rotational component operably disposed at least proximal to the neck portion of the head housing component, wherein the first neck portion rotational component is configured to rotate completely around a first neck portion rotational axis. In addition, the head component also includes a band component operably engaged with the first head portion rotational component and the first neck portion rotational component such that when the first neck portion rotational component rotates in a first direction, the band component and the first head portion rotational component rotate in the first direction or when the first neck portion rotational component rotates in a second direction, the band component and the first head portion rotational component rotate in the second direction, wherein the first neck portion rotational component is operably connected, or reversibly connectable, to a rotational mechanism, and wherein the head component is configured to reversibly operably connect to a handle component that comprises a handle housing component comprises a motor component operably connected, or reversibly connectable, to a power source and to the rotational mechanism such that when the head component is operably connected to the handle component and when the motor component effects rotation of the rotational mechanism, the first neck portion rotational component, the first head portion rotational component, and the band component rotate in the first direction or in the second direction.

In another aspect, the present disclosure provides a head component that includes a head housing component comprising a head portion and a neck portion that are operably connected to one another, wherein the head portion comprises at least a top area that comprises at least a first top opening, and a first head portion rotational component operably disposed at least partially in the head portion of the head housing component, wherein the first head portion rotational component is configured to rotate completely around a first head portion rotational axis, wherein the first head portion rotational component comprises at least a first head portion gear component and at least a first implement that are operably connected to one another, and wherein at least a segment of the first head portion rotational component extends at least partially into and/or through the first top opening of the head portion such that the first implement at least partially extends from the head portion. The head component also includes a first neck portion rotational component operably disposed at least proximal to the neck portion of the head housing component, wherein the first neck portion rotational component is configured to rotate completely around a first neck portion rotational axis, wherein the first neck portion rotational component comprises at least a first neck portion gear component. In addition, the head component also includes a band component operably engaged with the first head portion gear component of the first head portion rotational component and the first neck portion gear component of the first neck portion rotational component such that when the first neck portion rotational component rotates in a first direction, the band component and the first head portion rotational component rotate in the first direction or when the first neck portion rotational component rotates in a second direction, the band component and the first head portion rotational component rotate in the second direction, wherein the first neck portion rotational component is operably connected, or reversibly connectable, to a second gear component, and wherein the head component is configured to reversibly operably connect to a handle component, which handle component comprises a motor component operably connected, or reversibly connectable, to a power source and to a third gear component, which third gear component is operably connected, or reversibly connectable, to the second gear component such that when the head component is operably connected to the handle component and when the motor component effects rotation of the third gear component, the second gear component, the first neck portion rotational component, the first head portion rotational component, and the band component rotate in the first direction or in the second direction.

In some embodiments, the first head portion rotational component comprises at least a first head portion gear component operably connected to the first implement; the first neck portion rotational component comprises at least a first neck portion gear component; the band component is operably engaged with the first head portion gear component of the first head portion rotational component and the first neck portion gear component of the first neck portion rotational component such that when the first neck portion rotational component rotates in the first direction, the band component and the first head portion rotational component rotate in the first direction or when the first neck portion rotational component rotates in the second direction, the band component and the first head portion rotational component rotate in the second direction; the first neck portion rotational component is operably connected, or reversibly connectable, to a second gear component; and the head component is configured to reversibly operably connect to a handle component, which handle component comprises a motor component operably connected, or reversibly connectable, to a power source and to a third gear component, which third gear component is operably connected, or reversibly connectable, to the second gear component such that when the head component is operably connected to the handle component and when the motor component effects rotation of the third gear component, the second gear component, the first neck portion rotational component, the first head portion rotational component, and the band component rotate in the first direction or in the second direction. In some embodiments, the first head portion rotational component and the first neck portion rotational component each comprise a pulley component. In some embodiments, the head component comprises at least one channel at least partially disposed within the head housing component and wherein at least a portion of the band component is disposed at least partially within the channel and is configured to move through the channel. In some embodiments, the head component comprises at least two channels at least partially disposed within the head housing component and wherein the band component is disposed at least partially within the channels and is configured to move through the channels. In some embodiments, the head component comprises at least one support structure disposed at least partially within the head housing component. In some embodiments, the support structure is disposed at least partially between the channels.

In some embodiments, the band component comprises a plurality of at least partially spherical or substantially disk-shaped projections. In some embodiments, the first head portion rotational component and the first neck portion rotational component each comprise spherical or substantially disk-shaped projection receiving areas that are structured to receive at least portions of the spherical or substantially disk-shaped projections such that when the first neck portion rotational component rotates in a first direction, the band component and the first head portion rotational component rotate in the first direction or when the first neck portion rotational component rotates in a second direction, the band component and the first head portion rotational component rotate in the second direction when the spherical or substantially disk-shaped projection receiving areas receive at least the portions of the spherical projections and at least the spherical or substantially disk-shaped projections engage the first head portion rotational component and the first neck portion rotational component. In some embodiments, the top area of the head component further comprises at least a second top opening, wherein a second head portion rotational component is operably disposed at least partially in the head portion of the head housing component, wherein the second head portion rotational component is configured to rotate completely around a second rotational axis, wherein the second head portion rotational component comprises at least a second implement, wherein at least a segment of the second head portion rotational component extends at least partially into and/or through the second top opening of the head portion such that the second implement at least partially extends from the head portion, and wherein the band component is further operably engaged with the second head portion rotational component and/or the first and second head portion rotational components operably engage one another such that when the first neck portion rotational component rotates in the first direction, the band component and the first head portion rotational component rotate in the first direction and the second head portion rotational component rotates in the second direction or when the first neck portion rotational component rotates in the second direction, the band component and the first head portion rotational component rotate in the second direction and the second head portion rotational component rotates in the first direction. In some embodiments, the second head portion rotational component comprises a pulley component. In some embodiments, wherein the band component comprises a plurality of at least partially spherical or substantially disk-shaped projections, the first and second head portion rotational components and the first neck portion rotational component each comprise spherical or substantially disk-shaped projection receiving areas that are structured to receive at least portions of the spherical or substantially disk-shaped projections such that when the first neck portion rotational component rotates in a first direction, the band component and the first head portion rotational component rotate in the first direction and the second head portion rotational component rotates in the second direction or when the first neck portion rotational component rotates in a second direction, the band component and the first head portion rotational component rotate in the second direction and the second head portion rotational component rotates in the first direction when the spherical or substantially disk-shaped projection receiving areas receive at least the portions of the spherical or substantially disk-shaped projections and at least the spherical or substantially disk-shaped projections engage the first and second head portion rotational components and the first neck portion rotational component. In some embodiments, the first and second head portion rotational components each comprise gear structures that mesh with one another when the first and second head portion rotational components rotate relative to one another.

In some embodiments, a first surface of the band component comprises a first set of projections that engage with the first head portion gear component of the first head portion rotational component and the first neck portion gear component of the first neck portion rotational component. In some embodiments, the top area of the head component further comprises at least a second top opening, wherein a second head portion rotational component is operably disposed at least partially in the head portion of the head housing component, wherein the second head portion rotational component is configured to rotate completely around a second rotational axis, wherein the second head portion rotational component comprises at least a second head portion gear component and at least a second implement that are operably connected to one another, wherein at least a segment of the second head portion rotational component extends at least partially into and/or through the second top opening of the head portion such that the second implement at least partially extends from the head portion, and wherein the band component is further operably engaged with the second head portion gear component and the first head portion gear component and/or the first and second head portion rotational components operably engage one another such that when the first neck portion rotational component rotates in the first direction, the band component and the first head portion rotational component rotate in the first direction and the second head portion rotational component rotates in the second direction or when the first neck portion rotational component rotates in the second direction, the band component and the first head portion rotational component rotate in the second direction and the second head portion rotational component rotates in the first direction. In some embodiments, the first direction and the second direction are substantially opposite one another. In some embodiments, a first surface of the band component comprises a first set of projections that engage with the first head portion gear component of the first head portion rotational component and the first neck portion gear component of the first neck portion rotational component and wherein a second surface of the band component comprises a second set of projections that engage with the second head portion gear component of the second head portion rotational component. In some embodiments, the first implement and the second implement are independently selected from the group consisting of: a prophy cup, a bristle component, a flossing component, a polishing component, and a combination of two or more thereof. In some embodiments, a device comprises the head component.

In another aspect, the present disclosure provides a device, comprising a head component that comprises: a head housing component comprising a head portion and a neck portion that are operably connected, or connectable, to one another, wherein the head portion comprises at least a top area that comprises at least a first top opening; a first head portion rotational component operably disposed at least partially in the head portion of the head housing component, wherein the first head portion rotational component is configured to rotate at least partially around a first head portion rotational axis, wherein the first head portion rotational component comprises at least a first implement, and wherein at least a segment of the first head portion rotational component extends at least partially into and/or through the first top opening of the head portion such that the first implement at least partially extends from the head portion; and a first channel at least partially disposed in the neck portion of the head housing component, wherein the first channel fluidly communicates with at least a portion of the first head portion rotational component; a handle component operably connected, or connectable, to the head component, which handle component comprises a handle housing component; and, a fluid container at least partially disposed in the handle housing component, which fluid container is operably connected, or connectable, to the first channel such that when fluid flows from the fluid container through the first channel, the first head portion rotational component rotates at least partially around the first head portion rotational axis.

In some embodiments, the device comprises an operably connected switch or valve mechanism that is configured to selectively effect the fluid to flow from the fluid container through the first channel. In some embodiments, the fluid container is substantially completely disposed in the handle housing component. In some embodiments, the first head portion rotational component comprises at least one impeller structure. In some embodiments, the top area of the head component further comprises at least a second top opening, wherein a second head portion rotational component is operably disposed at least partially in the head portion of the head housing component, wherein the second head portion rotational component is configured to rotate at least partially around a second head portion rotational axis, wherein the second head portion rotational component comprises at least a second implement, wherein at least a segment of the second head portion rotational component extends at least partially into and/or through the second top opening of the head portion such that the second implement at least partially extends from the head portion, and wherein at least a portion of the first head portion rotational component is operably engaged with at least a portion of the second head portion rotational component such that when the fluid flows from the fluid container through the first channel, the first head portion rotational component and the second head portion rotational component rotate in directions that are substantially opposite one another. In some embodiments, the head component comprises a second channel and/or one or more vent openings configured to receive exhaust fluid from the first head portion rotational component when the fluid flows from the fluid container through the first channel. In some embodiments, the head component comprises one or more exhaust fluid fins that are configured to direct the exhaust fluid from the first head portion rotational component to the second channel and/or the one or more vent openings when the fluid flows from the fluid container through the first channel. In some embodiments, the first channel comprises one or more openings disposed proximal to the first head portion rotational component that direct the fluid toward the first head portion rotational component when the fluid flows from the fluid container through the first channel to effect rotation of at least the first head portion rotational component. In some embodiments, a manifold structure comprises the one or more openings of the first channel. In some embodiments, the first head portion rotational component and the second head portion rotational component each comprise at least one impeller structure that operably engage one another. In some embodiments, the impeller structure of at least the first head portion rotational component comprises at least a primary impeller and at least a secondary impeller. In some embodiments, the first head portion rotational component and the second head portion rotational component each comprise at least one gear component that operably engage one another. In some embodiments, the fluid container comprises the fluid. In some embodiments, the fluid comprises a gas. In some embodiments, the gas is at least partially compressed. In some embodiments, the fluid comprises a liquid. In some embodiments, the fluid container is removable from the handle housing component. In some embodiments, the fluid container is configured to reversibly fluidly communicate with a fluid replenishing station that is structured to replenish fluid in the fluid container. In some embodiments, the fluid replenishing station comprises a gas compressor apparatus. In some embodiments, the head component and the handle component are fabricated integral with one another. In some embodiments, the head component is reversibly connectable to the handle component. In some embodiments, the head portion of the head component is reversibly connectable to the neck portion of the head component. In some embodiments, the device comprises a dental device. In some embodiments, the dental device comprises a toothbrush. In some embodiments, the first implement and the second implement are independently selected from the group consisting of: a prophy cup, a bristle component, a flossing component, a polishing component, and a combination of two or more thereof. In some embodiments, the first implement and the second implement are independently selected from the group consisting of: a cleaning component, a polishing component, a sanding component, and a scrubbing component.

In another aspect, the present disclosure provides a head component that comprises a head housing component comprising a head portion and a neck portion that are operably connected, or connectable, to one another, wherein the head portion comprises at least a top area that comprises at least a first top opening; a first head portion rotational component operably disposed at least partially in the head portion of the head housing component, wherein the first head portion rotational component is configured to rotate at least partially around a first head portion rotational axis, wherein the first head portion rotational component comprises at least a first implement, and wherein at least a segment of the first head portion rotational component extends at least partially into and/or through the first top opening of the head portion such that the first implement at least partially extends from the head portion; and a first channel at least partially disposed in the neck portion of the head housing component, wherein the first channel fluidly communicates with at least a portion of the first head portion rotational component; wherein the head component is configured to reversibly operably connect to a handle component that comprises a handle housing component and to a fluid container at least partially disposed in the handle housing component, which fluid container is configured to reversibly operably connect to the first channel such that when fluid flows from the fluid container through the first channel, the first head portion rotational component rotates at least partially around the first head portion rotational axis.

In some embodiments, the first head portion rotational component comprises at least one impeller structure. In some embodiments, the top area of the head component further comprises at least a second top opening, wherein a second head portion rotational component is operably disposed at least partially in the head portion of the head housing component, wherein the second head portion rotational component is configured to rotate at least partially around a second head portion rotational axis, wherein the second head portion rotational component comprises at least a second implement, wherein at least a segment of the second head portion rotational component extends at least partially into and/or through the second top opening of the head portion such that the second implement at least partially extends from the head portion, and wherein at least a portion of the first head portion rotational component is operably engaged with at least a portion of the second head portion rotational component such that when the fluid flows from the fluid container through the first channel, the first head portion rotational component and the second head portion rotational component rotate in directions that are substantially opposite one another. In some embodiments, the head component comprises a second channel and/or one or more vent openings configured to receive exhaust fluid from the first head portion rotational component when the fluid flows from the fluid container through the first channel. In some embodiments, the head component comprises one or more exhaust fluid fins that are configured to direct the exhaust fluid from the first head portion rotational component to the second channel and/or the one or more vent openings when the fluid flows from the fluid container through the first channel. In some embodiments, the first channel comprises one or more openings disposed proximal to the first head portion rotational component that direct the fluid toward the first head portion rotational component when the fluid flows from the fluid container through the first channel to effect rotation of at least the first head portion rotational component. In some embodiments, a manifold structure comprises the one or more openings of the first channel. In some embodiments, the first head portion rotational component and the second head portion rotational component each comprise at least one impeller structure that operably engage one another. In some embodiments, the impeller structure of at least the first head portion rotational component comprises at least a primary impeller and at least a secondary impeller. In some embodiments, the first head portion rotational component and the second head portion rotational component each comprise at least one gear component that operably engage one another. In some embodiments, the first implement and the second implement are independently selected from the group consisting of: a prophy cup, a bristle component, a flossing component, a polishing component, and a combination of two or more thereof. In some embodiments, a device comprises the head component.

In another aspect, the present disclosure provides a device that comprises a head component that comprises: a head housing component comprising a head portion and a neck portion that are operably connected, or connectable, to one another, wherein the head portion comprises at least a top area that comprises at least a first top opening and at least a second top opening; a first head portion rotational component operably disposed at least partially in the head portion of the head housing component, wherein the first head portion rotational component is configured to rotate at least partially around a first head portion rotational axis, wherein the first head portion rotational component comprises at least a first implement, and wherein at least a segment of the first head portion rotational component extends at least partially into and/or through the first top opening of the head portion such that the first implement at least partially extends from the head portion; a second head portion rotational component operably disposed at least partially in the head portion of the head housing component, wherein the second head portion rotational component is configured to rotate at least partially around a second rotational axis, wherein the second head portion rotational component comprises at least a second implement, and wherein at least a segment of the second head portion rotational component extends at least partially into and/or through the second top opening of the head portion such that the second implement at least partially extends from the head portion; a rotational mechanism operably connected, or reversibly connectable, to the first head portion rotational component and to the second head portion rotational component; and a first channel at least partially disposed in the neck portion of the head housing component, wherein the first channel fluidly communicates with at least a portion of at least the first head portion rotational component. The device also includes a handle component operably connected, or connectable, to the head component, which handle component comprises a handle housing component; and a fluid source at least partially disposed in the handle housing component, which fluid source is operably connected, or connectable, to the first channel such that when fluid flows from the fluid source through the first channel, the first head portion rotational component rotates at least partially around the first head portion rotational axis in a first direction and the second head portion rotational component rotates at least partially around the second head portion rotational axis in a second direction or the first head portion rotational component rotates at least partially around the first head portion rotational axis in the second direction and the second head portion rotational component rotates at least partially around the second head portion rotational axis in the first direction.

In some embodiments, the device comprises an operably connected switch or valve mechanism that is configured to selectively effect the fluid to flow from the fluid source through the first channel. In some embodiments, the fluid source comprises a fluid container that is substantially completely disposed in the handle housing component. In some embodiments, the first head portion rotational component comprises at least one impeller structure. In some embodiments, the head component comprises a second channel and/or one or more vent openings configured to receive exhaust fluid from the first head portion rotational component when the fluid flows from the fluid source through the first channel. In some embodiments, the head component comprises one or more exhaust fluid fins that are configured to direct the exhaust fluid from the first head portion rotational component to the second channel and/or the one or more vent openings when the fluid flows from the fluid source through the first channel. In some embodiments, the first channel comprises one or more openings disposed proximal to the first head portion rotational component that direct the fluid toward the first head portion rotational component when the fluid flows from the fluid source through the first channel to effect rotation of at least the head portion rotational component. In some embodiments, a manifold structure comprises the one or more openings of the first channel. In some embodiments, the first head portion rotational component and the second head portion rotational component each comprise at least one impeller structure that operably engage one another. In some embodiments, the impeller structure of at least the first head portion rotational component comprises at least a primary impeller and at least a secondary impeller. In some embodiments, the first head portion rotational component and the second head portion rotational component each comprise at least one gear component that operably engage one another. In some embodiments, the fluid source is disposed at least partially external to the device. In some embodiments, a fluid container comprises the fluid source. In some embodiments, the fluid container comprises the fluid. In some embodiments, the fluid comprises a gas. In some embodiments, the gas is at least partially compressed. In some embodiments, the fluid comprises a liquid. In some embodiments, the fluid container is removable from the handle housing component. In some embodiments, the fluid container is configured to reversibly fluidly communicate with a fluid replenishing station that is structured to replenish fluid in the fluid container. In some embodiments, the fluid replenishing station comprises a gas compressor apparatus. In some embodiments, the head component and the handle component are fabricated integral with one another. In some embodiments, the head component is reversibly connectable to the handle component. In some embodiments, the head portion of the head component is reversibly connectable to the neck portion of the head component. In some embodiments, the device comprises a dental device. In some embodiments, the dental device comprises a toothbrush. In some embodiments, the first implement and the second implement are independently selected from the group consisting of: a prophy cup, a bristle component, a flossing component, a polishing component, and a combination of two or more thereof. In some embodiments, the first implement and the second implement are independently selected from the group consisting of: a cleaning component, a polishing component, a sanding component, and a scrubbing component.

In another aspect, the present disclosure provides a head component that comprises a head housing component comprising a head portion and a neck portion that are operably connected, or connectable, to one another, wherein the head portion comprises at least a top area that comprises at least a first top opening and at least a second top opening; a first head portion rotational component operably disposed at least partially in the head portion of the head housing component, wherein the first head portion rotational component is configured to rotate at least partially around a first head portion rotational axis, wherein the first head portion rotational component comprises at least a first implement, and wherein at least a segment of the first head portion rotational component extends at least partially into and/or through the first top opening of the head portion such that the first implement at least partially extends from the head portion; a second head portion rotational component operably disposed at least partially in the head portion of the head housing component, wherein the second head portion rotational component is configured to rotate at least partially around a second rotational axis, wherein the second head portion rotational component comprises at least a second implement, and wherein at least a segment of the second head portion rotational component extends at least partially into and/or through the second top opening of the head portion such that the second implement at least partially extends from the head portion; a rotational mechanism operably connected, or reversibly connectable, to the first head portion rotational component and to the second head portion rotational component; and a first channel at least partially disposed in the neck portion of the head housing component, wherein the first channel fluidly communicates with at least a portion of at least the first head portion rotational component; wherein the head component is configured to reversibly operably connect to a handle component that comprises a handle housing component and to a fluid source at least partially disposed in the handle housing component, which fluid source is configured to reversibly operably connect to the first channel such that when fluid flows from the fluid source through the first channel, the first head portion rotational component rotates at least partially around the first head portion rotational axis in a first direction and the second head portion rotational component rotates at least partially around the second head portion rotational axis in a second direction or the first head portion rotational component rotates at least partially around the first head portion rotational axis in the second direction and the second head portion rotational component rotates at least partially around the second head portion rotational axis in the first direction.

In some embodiments, the first head portion rotational component comprises at least one impeller structure. In some embodiments, the head component comprises a second channel and/or one or more vent openings configured to receive exhaust fluid from the first head portion rotational component when the fluid flows from the fluid source through the first channel. In some embodiments, the head component comprises one or more exhaust fluid fins that are configured to direct the exhaust fluid from the first head portion rotational component to the second channel and/or the one or more vent openings when the fluid flows from the fluid source through the first channel. In some embodiments, the first channel comprises one or more openings disposed proximal to the first head portion rotational component that direct the fluid toward the first head portion rotational component when the fluid flows from the fluid source through the first channel to effect rotation of at least the head portion rotational component. In some embodiments, a manifold structure comprises the one or more openings of the first channel. In some embodiments, the first head portion rotational component and the second head portion rotational component each comprise at least one impeller structure that operably engage one another. In some embodiments, the impeller structure of at least the first head portion rotational component comprises at least a primary impeller and at least a secondary impeller. In some embodiments, the first head portion rotational component and the second head portion rotational component each comprise at least one gear component that operably engage one another. In some embodiments, the first implement and the second implement are independently selected from the group consisting of: a prophy cup, a bristle component, a flossing component, a polishing component, and a combination of two or more thereof. In some embodiments, a device comprises the head component.

In another aspect, the present disclosure provides a method of operating a device, the method comprising rotating a first neck portion rotational component of the device, which first neck portion rotational component is operably engaged with a band component that is operably engaged with a first head portion rotational component that comprises at least a first implement such that the first head portion rotational component and the first implement rotate completely around a first head portion rotational axis in a first direction, thereby operating the device. In some embodiments, the method further comprises rotating a second head portion rotational component of the device, which second head portion rotational component comprises at least a second implement and which second head portion rotational component is operably engaged with the band component such that the second head portion rotational component and the second implement rotate completely around a second head portion rotational axis in a second direction. In some embodiments, the first and second implements comprise dental implements and the method further comprises contacting the first implement and/or the second implement with one or more teeth and/or dental appliances of a subject.

In another aspect, the present disclosure provides a method of operating a device, the method comprising flowing a fluid through a first channel at least partially disposed in a neck portion of a head housing component of the device, which first channel fluidly communicates with at least a portion of at least a first head portion rotational component operably disposed at least partially in the head housing component, which first head portion rotational component operably engages a second head portion rotational component operably disposed at least partially in the head housing component such that the first head portion rotational component and the second head portion rotational component rotate in directions that are substantially opposite one another, wherein the first head portion rotational component comprises at least a first implement that at least partially extends from the head housing component of the device and wherein the second head portion rotational component comprises at least a second implement that at least partially extends from the head housing component of the device. In some embodiments, the method comprises flowing the fluid through the first channel from a fluid container disposed in a handle housing component of the device. In some embodiments, the first and second implements comprise dental implements and wherein the method further comprises contacting the first dental implement and/or the second dental implement with one or more teeth and/or dental appliances of a subject.

BRIEF DESCRIPTION OF THE DRAWINGS

The description provided herein is better understood when read in conjunction with the accompanying drawings which are included by way of example and not by way of limitation. It will be understood that like reference numerals identify like components throughout the drawings, unless the context indicates otherwise. It will also be understood that some or all of the figures may be schematic representations for purposes of illustration and do not necessarily depict the actual relative sizes or locations of the elements shown.

FIG. 3A schematically illustrates some components of a device from a partially exploded side view.

FIG. 3B schematically illustrates a device that comprises the components of FIG. 3A from a transparent side view.

FIG. 3C schematically illustrates the device of FIG. 3B from a side view.

FIG. 3D schematically illustrates the device of FIG. 3B from a top view.

FIG. 5C schematically illustrates the device of FIG. 5B from a side view.

FIG. 5D schematically illustrates the device of FIG. 5B from a top view.

FIG. 6A schematically shows a head component that is configured to reversibly operably connect to a handle component of a device prior to connecting the head component to the handle component from a transparent side view according to one embodiment.

FIG. 6B schematically illustrates the head component of FIG. 6A operably connected to the handle component of FIG. 6A from a transparent side view.

FIG. 11A schematically illustrates some components of a device from a partially exploded side view.

FIG. 11B schematically illustrates a device that comprises the components of FIG. 11A from a transparent side view.

FIG. 16A schematically illustrates a rotational component (e.g., a fluid driven head portion rotational component having a primary impeller and a secondary impeller) from a bottom view according to one embodiment.

FIG. 16B schematically shows the rotational component of FIG. 16A from a side view.

FIG. 16C schematically depicts the rotational component of FIG. 16A from a top view.

FIG. 17 schematically illustrates aspects of a fluid driven device having a manifold structure and exhaust fluid fins from a transparent top view according to one embodiment.

DETAILED DESCRIPTION

Figure 1A:
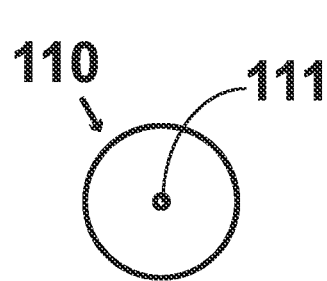
FIG. 1A schematically illustrates a rotational component (e.g., a head portion rotational component or aspects of a neck portion rotational component) from a bottom view according to one embodiment.
Figure 1B:
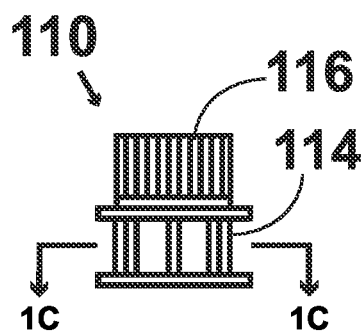
FIG. 1B schematically shows the rotational component of FIG. 1A from a side view.
Figure 1C:
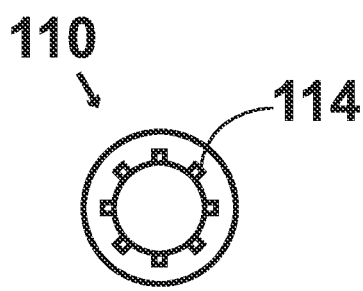
FIG. 1C schematically depicts the rotational component of FIG. 1A from a sectional view.
Figure 1D:
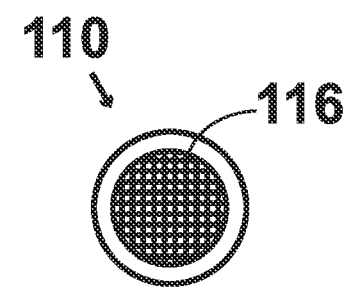
FIG. 1D schematically depicts the rotational component of FIG. 1A from a top view.
Figure 2A:
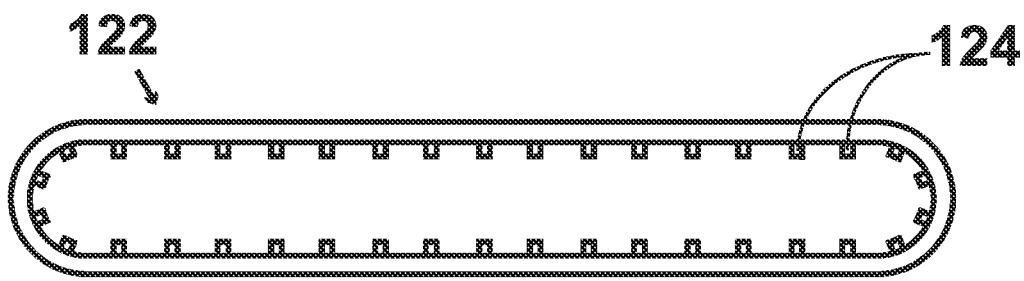
FIG. 2A schematically shows a band component from a top view according to one embodiment.
Figure 2B:
FIG. 2B schematically illustrates the band component of FIG. 2A from a side view.
Figure 4A:
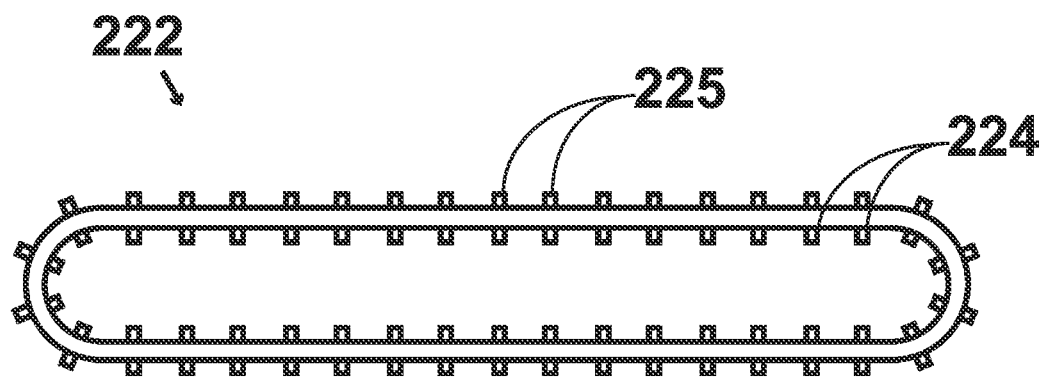
FIG. 4A schematically shows a band component from a top view according to one embodiment.
Figure 4B:
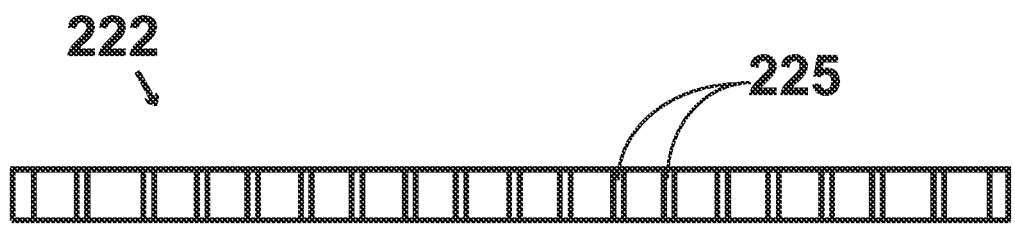
FIG. 4B schematically illustrates the band component of FIG. 4A from a side view.
Figure 5A:
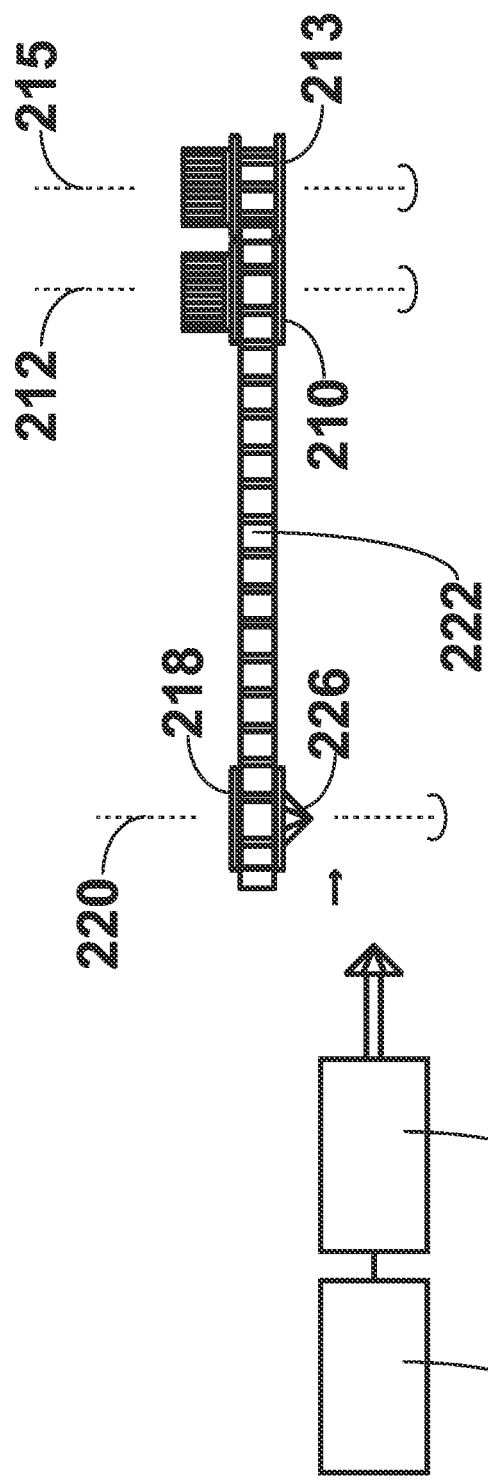
FIG. 5A schematically illustrates some components of a device from a partially exploded side view.
Figure 5B:
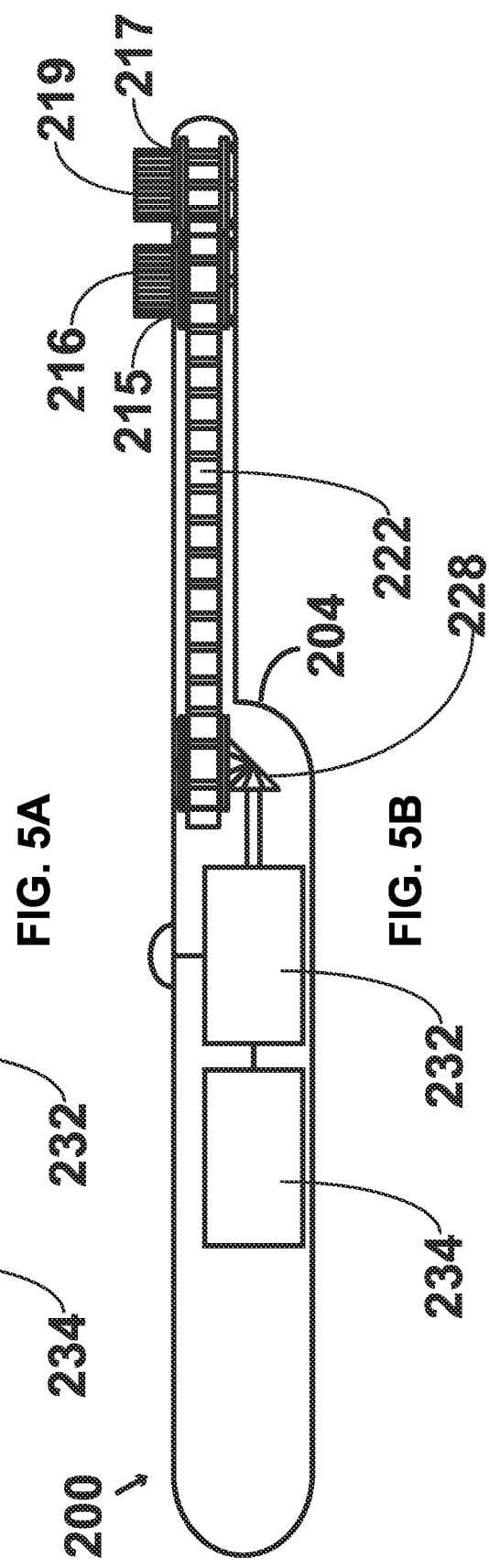
FIG. 5B schematically illustrates a device that comprises the components of FIG. 5A from a transparent side view.
Figure 7A:
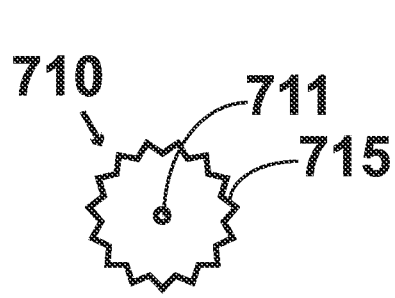
FIG. 7A schematically illustrates a rotational component (e.g., a head portion rotational component or aspects of a neck portion rotational component) from a bottom view according to one embodiment.
Figure 7B:
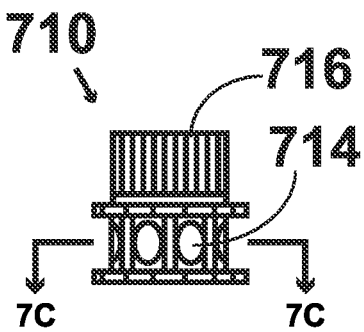
FIG. 7B schematically shows the rotational component of FIG. 7A from a side view.
Figure 7C:
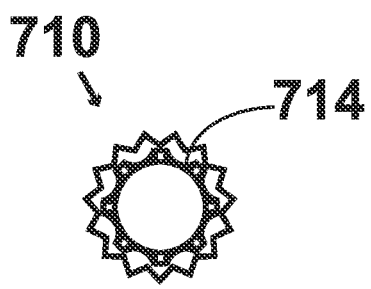
FIG. 7C schematically depicts the rotational component of FIG. 7A from a sectional view.
Figure 7D:
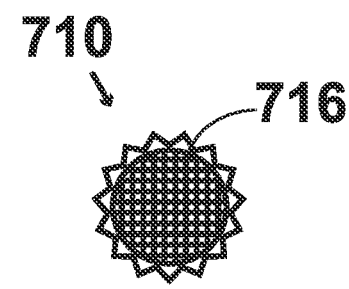
FIG. 7D schematically depicts the rotational component of FIG. 7A from a top view.
Figure 8A:
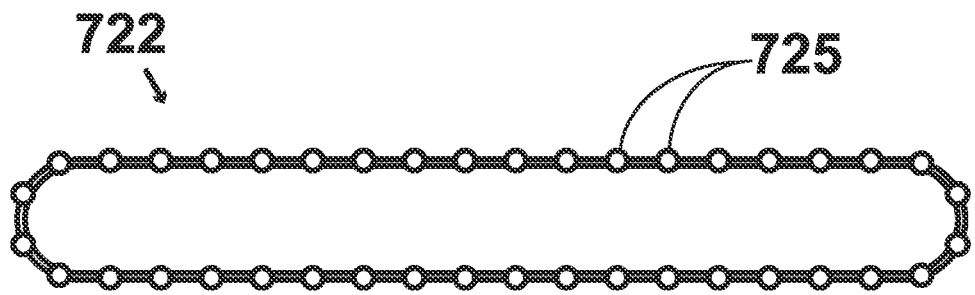
FIG. 8A schematically shows a band component from a top view according to one embodiment.
Figure 8B:
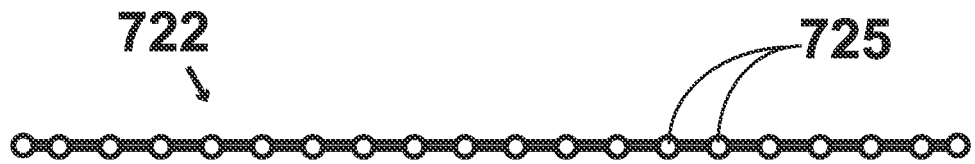
FIG. 8B schematically illustrates the band component of FIG. 8A from a side view.
Figure 9A:
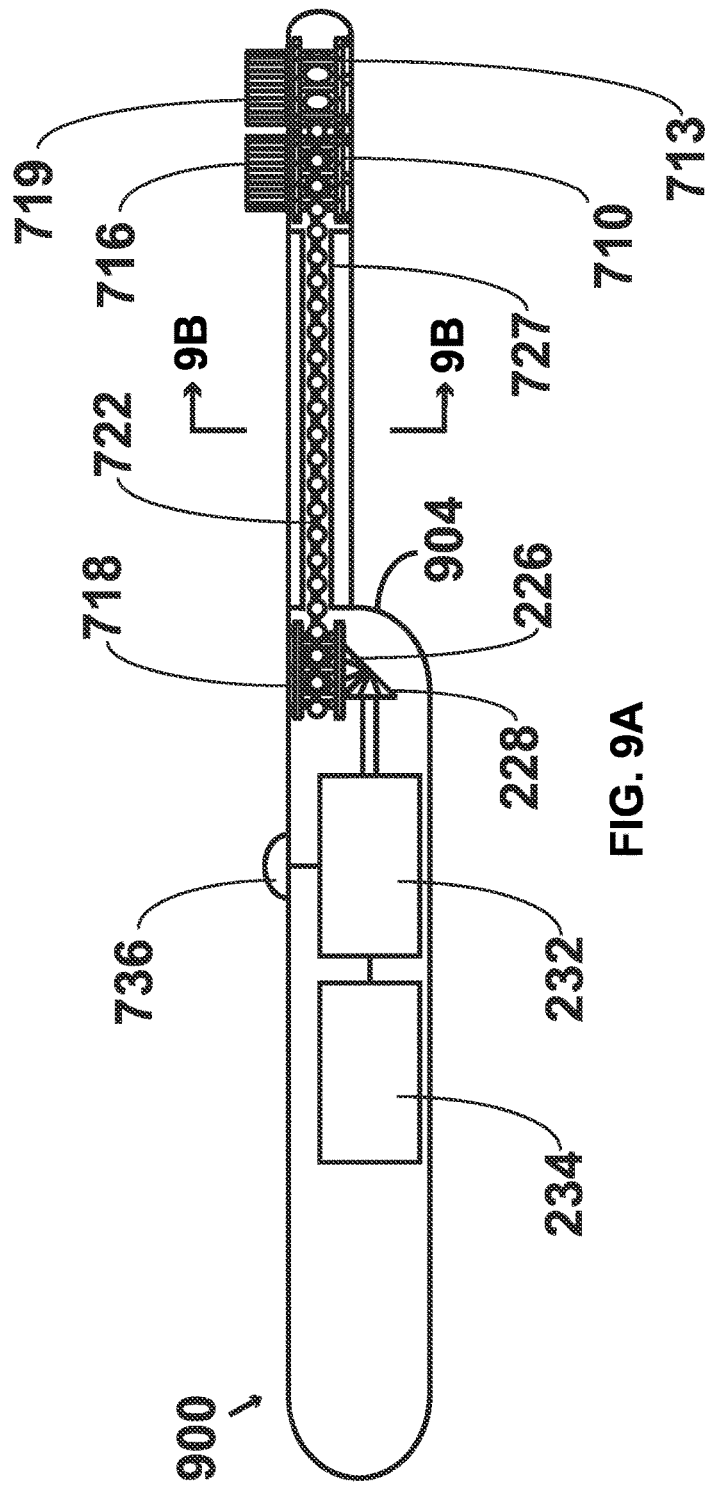
FIG. 9A schematically illustrates a device from a transparent side view according to one embodiment.
Figure 9B:
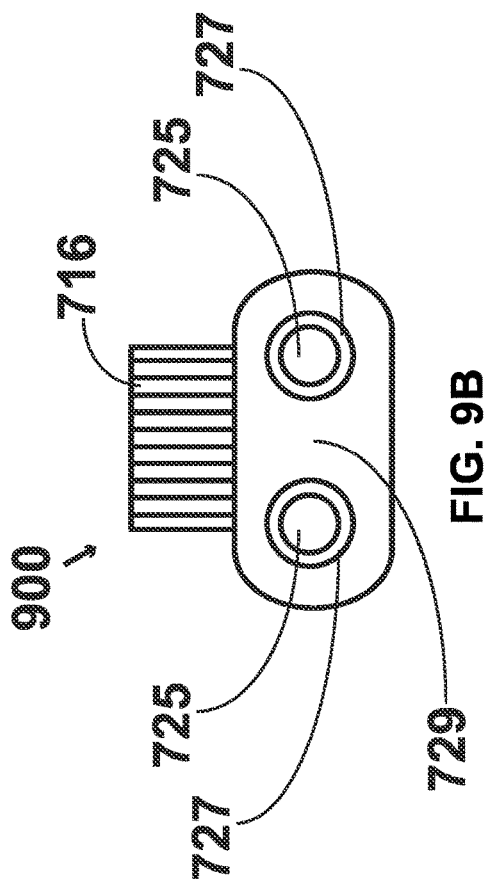
FIG. 9B schematically depicts the device of FIG. 9A from a sectional view.

Before describing the invention in detail, it is to be understood that this invention is not limited to particular head or handle components, or devices, which can vary. As used in this specification and the appended claims, the singular forms "a," "an," and "the" also include plural referents unless the context clearly provides otherwise. It is also to be understood that the terminology used herein is for the purpose of describing particular embodiments only, and is not intended to be limiting. Further, unless defined otherwise, all technical and scientific terms used herein have the same meaning as commonly understood by one of ordinary skill in the art to which this invention pertains.

The present disclosure relates to devices and components thereof that include one or more rotational components of use in numerous applications. In some embodiments, for example, rotational components include cleaning and/or polishing implements that are used in various household or industrial sanitization applications. In other exemplary embodiments, rotational components include assorted combinations of dental implements (e.g., bristles (nylon, silicone, thermoplastic elastomers (TPE), and the like), flossing components, polishing components (e.g., prophy cups, etc.), and the like). In these applications, the dental devices are optionally used by professional dental hygienists to clean and polish patients' teeth or by individual users for their own personal oral care. In other exemplary embodiments, among many others, rotational components optionally include sanding, scrubbing, and/or polishing implements of use in various woodworking and auto body repair applications. To further illustrate, in some of these embodiments, at least a portion of an implement comprises at least one cross-sectional shape selected from the group consisting of: a circle, an oval, a square, a rectangle, a trapezoid, an irregular n-sided polygon, and a regular n-sided polygon.

In addition to including rotational components (e.g., 2, 3, 4, 5, 6, 7, 8, 9, 10, 11, 12, 13, 14, 15, or more rotational components), neighboring pairs of rotational components typically rotate in opposite directions (i.e., counter-rotate) relative to one another. The mechanisms of action disclosed herein in which neighboring rotational components are moving in different directions is effective in performing numerous applications. In some embodiments, rotational components are configured to oscillate (i.e., move back-and-forth within a selected range of motion). In some embodiments, rotational components rotate continuously in at least one direction around rotational axes. The representative embodiments described herein are intended to illustrate, but not to limit, the invention. Essentially any combination of components or portions thereof described herein are optionally utilized or adapted for use together in some embodiments.

To illustrate, FIGS. 1A-1D, 2A, 2B, and 3A-3D schematically show a device or components thereof from various views according to one embodiment. As shown, device 100 includes head component 102 that comprises housing component 104 comprising head portion 106 and neck portion 108 that are operably connected to one another (e.g., via housing component 104). As also show, head portion 106 comprises a top area that comprises first top opening 115, and first head portion rotational component 110 operably disposed at least partially in head portion 106 of housing component 104. First head portion rotational component 110 is configured to rotate completely around first head portion rotational axis 112. First head portion rotational component 110 comprises a rotational mechanism (shown as including first head portion gear component 114 in the embodiment shown) and first implement 116 (shown as a bristle carrier) that are operably connected to one another. In some embodiments, rotational components include alignment features (e.g., alignment feature 111) that are male or female elements that are configured to mate with corresponding female or male elements disposed on housing component 104 to align and permit rotation of the rotational components relative to housing component 104, while minimizing friction between those elements. In some embodiments, housing components and/or rotational components include projection elements 113 that can also help to align and minimize friction between rotational components and housing components. As shown, at least a segment of first head portion rotational component 110 extends into first top opening 115 of head portion 106 such that first implement 116 extends from head portion 106. Head component 102 also includes first neck portion rotational component 118 operably disposed at least proximal to neck portion 108 of housing component 104. First neck portion rotational component 118 is similar to first head portion gear component 114, but lacks first implement 116 in the embodiment shown. First neck portion rotational component 118 is configured to rotate completely around first neck portion rotational axis 120. First neck portion rotational component 118 comprises a first neck portion gear component (structured essentially the same as first head portion gear component 114 in some embodiments).

As also shown, device 100 also includes band component 122 operably engaged with first head portion gear component 114 of first head portion rotational component 110 and the first neck portion gear component of first neck portion rotational component 118 such that when first neck portion rotational component 118 rotates in a first direction, band component 122 and first head portion rotational component 110 rotate in the first direction or when first neck portion rotational component 118 rotates in a second direction, band component 122 and first head portion rotational component 110 rotate in the second direction. Essentially any suitable band component configuration is optionally utilized. In some embodiments, for example, a first surface of band component 122 comprises first set of projections 124 that engage with first head portion gear component 114 of first head portion rotational component 110 and the first neck portion gear component of first neck portion rotational component 118. Projections 124 are typically structured to operably mesh with first head portion gear component 114 and the first neck portion gear component of first neck portion rotational component 118. In some embodiments, band components lack projections and instead effect rotation of, for example, first head portion rotational component 110 via compression with first head portion rotational component 110. Band components can be fabricated from various materials or combinations of materials, including metal, rubber, KEVLAR®, fiber glass, plastic, fabric, or the like.

Typically, second gear component 126 (e.g., a bevel gear component, a spur gear component, etc.) is operably connected, or reversibly connectable, to first neck portion rotational component 118, and third gear component 128 (e.g., a bevel gear component, a spur gear component, etc.) is operably connected, or reversibly connectable, to second gear component 126.

As also shown, device 100 also includes handle component 130 operably connected, or connectable, to head component 102. In some embodiments, the head component and the handle component are fabricated integral with one another. In some embodiments, the head component is reversibly connectable to the handle component. Handle component 130 comprises motor component 132 operably connected, or reversibly connectable, to power source 134 (e.g., a rechargeable battery (e.g., via induction charging), disposable battery, a separate power outlet, etc.) and to third gear component 128 (via a rotational shaft in the embodiment shown) such that when motor component 132 effects rotation of third gear component 128, second gear component 126, first neck portion rotational component 118, first head portion rotational component 110, and band component 122 rotate in the first direction or in the second direction when third gear component 128 is operably connected to second gear component 126 and when second gear component 126 is operably connected to first neck portion rotational component 118. As shown, handle component 130 also includes switch 136 operably connected to motor component 132 to control the operation of motor component 132.

To further illustrate, FIGS. 4A, 4B, and 5A-5D schematically show a device or components thereof from various views according to another embodiment. As shown, device 200 includes head component 202 that comprises housing component 204 comprising head portion 206 and neck portion 208 that are operably connected to one another (e.g., via housing component 204). As also show, head portion 206 comprises a top area that comprises first top opening 215, and first head portion rotational component 210 (structured the same as rotational component 110 in the embodiment shown) operably disposed at least partially in head portion 206 of housing component 204. First head portion rotational component 210 is configured to rotate completely around first head portion rotational axis 212. First head portion rotational component 210 comprises a rotational mechanism (shown as including first head portion gear component 114 in the embodiment shown) and first implement 216 (shown as a bristle carrier) that are operably connected to one another. As shown, at least a segment of first head portion rotational component 210 extends into first top opening 215 of head portion 206 such that first implement 216 extends from head portion 206. Head component 202 also includes first neck portion rotational component 218 operably disposed at least proximal to neck portion 208 of housing component 204. First neck portion rotational component 218 is similar to first head portion gear component 114, but lacks first implement 116 in the embodiment shown. First neck portion rotational component 218 is configured to rotate completely around first neck portion rotational axis 220. First neck portion rotational component 218 comprises a first neck portion gear component (structured essentially the same as first head portion gear component 114 in some embodiments).

As also shown, device 200 also includes band component 222 operably engaged with first head portion gear component 114 of first head portion rotational component 210 and the first neck portion gear component of first neck portion rotational component 218 such that when first neck portion rotational component 218 rotates in a first direction, band component 222 and first head portion rotational component 210 rotate in the first direction or when first neck portion rotational component 218 rotates in a second direction, band component 222 and first head portion rotational component 210 rotate in the second direction.

As also shown, the top area of head component 202 further comprises second top opening 217. Second head portion rotational component 213 is operably disposed at least partially in head portion 206 of housing component 204. Second head portion rotational component 213 is configured to rotate completely around second rotational axis 215. Second head portion rotational component 213 comprises at least a second head portion gear component (as with first head portion rotational component 210 this gear component is the same as gear component 114) and second implement 219 (shown as a bristle carrier) that are operably connected to one another. At least a segment of second head portion rotational component 213 extends at least partially into second top opening 217 of head portion 206 such that second implement 219 at least partially extends from head portion 206. Band component 222 is further operably engaged with the second head portion gear component of second head portion rotational component 213 and the first head portion gear component of first head portion rotational component 210 such that when first neck portion rotational component 218 rotates in the first direction, band component 222 and first head portion rotational component 210 rotate in the first direction and second head portion rotational component 213 rotates in the second direction or when first neck portion rotational component 218 rotates in the second direction, band component 222 and first head portion rotational component 210 rotate in the second direction and second head portion rotational component 213 rotates in the first direction. In some embodiments, the first direction and the second direction are substantially opposite one another. As shown, a first surface of band component 222 comprises first set of projections 224 that engage with the first head portion gear component of first head portion rotational component 210 and the first neck portion gear component of first neck portion rotational component 218 and a second surface of band component 222 comprises second set of projections 225 that engage with the second head portion gear component of second head portion rotational component 213. Essentially any suitable band component configuration is optionally utilized. In some embodiments, band component 222 lacks projections and instead effects rotation of, for example, first head portion rotational component 210 via compression with first head portion rotational component 110 and second head portion rotational component 213 via compression with second head portion rotational component 213. Band components can be fabricated from various materials or combinations of materials, including metal, rubber, KEVLAR®, fiber glass, plastic, fabric, or the like.

Typically, second gear component 226 (e.g., a bevel gear component, a spur gear component, etc.) is operably connected, or reversibly connectable, to first neck portion rotational component 218, and third gear component 228 (e.g., a bevel gear component, a spur gear component, etc.) is operably connected, or reversibly connectable, to second gear component 226. Exemplary gears that are optionally adapted for use with the components, devices, and related applications of the present disclosure are also described in, e.g., Dudley, Handbook of Practical Gear Design (Mechanical Engineering Series), CRC Press, 1st Ed. (1994) and Litvin and Fuentes, Gear Geometry and Applied Theory, Cambridge University Press; 2nd Ed. (2004), which are both incorporated herein in their entirety for all purposes.

As also shown, device 200 also includes handle component 230 operably connected, or connectable, to head component 202. In some embodiments, the head component and the handle component are fabricated integral with one another. In some embodiments, the head component is reversibly connectable to the handle component. Handle component 230 comprises motor component 232 operably connected, or reversibly connectable, to power source 234 (e.g., a rechargeable battery (e.g., via induction charging), disposable battery, a separate power outlet, etc.) and to third gear component 228 (via a rotational shaft in the embodiment shown) such that when motor component 232 effects rotation of third gear component 228, second gear component 226, first neck portion rotational component 218, first head portion rotational component 210, and band component 222 rotate in the first direction and second head portion rotational component 213 rotates in the second direction, when third gear component 228 is operably connected to second gear component 226 and when second gear component 226 is operably connected to first neck portion rotational component 218. As shown, handle component 230 also includes switch 236 operably connected to motor component 232 to control the operation of motor component 232.

In some embodiments, the present disclosure provides devices and head components that comprise multiple head portion rotational components, but which do not include band components, such as band component 222, which is configured to directly engage both first head portion rotational component 210 and second head portion rotational component 213 to effect counter-rotation of those rotational components. Device 1100 schematically depicted in FIGS. 11A and 11B illustrates such an exemplary embodiment. As shown, device 1100 is similar to device 200 described herein, but includes band component 122, instead of band component 222. Band component 122 directly engages first head portion rotational component 210, but not second head portion rotational component 213. First head portion rotational component 210 and second head portion rotational component 213 have been further modified to include gear components 1104 and 1102, respectively, which mesh with one another. During operation of device 1100, when band component 122 rotates, for example, in a first direction, first head portion rotational component 210 also rotates in the first direction, but second head portion rotational component 213 counter-rotates in a second direction substantially opposite the first direction due to the movement of meshed gear components 1104 and 1102.

To further illustrate, FIGS. 6A and 6B schematically show a device that includes a detachable head component. As shown, device 600 includes head component 602, which is configured essentially the same as head component 202 and the components disposed therein, as described herein. As shown, head component 602 is configured to reversibly attach to, and be retained in operable connection to, handle component 604 via retaining elements 606 (shown as compression projections in this embodiment). Handle component 604 is otherwise configured essentially the same as handle component 230, as discussed herein. When head component 602 is operably connected to handle component 604, second gear component 626 operably connects to neck portion rotational component 618 such that during operation of device 600, first implement 616 and second implement 619 counter-rotate relative to one another in some embodiments, as described herein. In some embodiments, first implement 616 and second implement 619 are configured to oscillate relative to one another.

To further illustrate, FIGS. 7A-7D, 8A, 8B, 9A, and 9B schematically show a device or components thereof from various views according to one embodiment. As shown, device 900 is configured similar to, for example, device 200 described herein in certain respects. Device 900 includes a head component (similar to head component 202) that comprises housing component 904 comprising a head portion (similar to head portion 206) and a neck portion (similar to neck portion 208) that are operably connected to one another (e.g., via housing component 904). As also show, the head portion comprises a top area that comprises a first top opening (similar to first top opening 215), and first head portion rotational component 710 operably disposed at least partially in the head portion of housing component 904. First head portion rotational component 710 (e.g., a pulley component or the like) comprises alignment feature 711 (configured similar to alignment feature 111). First head portion rotational component 710 is configured to rotate completely around a first head portion rotational axis (similar to first head portion rotational axis 212). First head portion rotational component 710 comprises a rotational mechanism (shown as including spherical projection receiving areas 714 in the embodiment shown) and first implement 716 (shown as a bristle carrier) that are operably connected to one another. In the exemplary embodiment shown, first head portion rotational component 710 also includes gear structure 715 that meshes with a corresponding gear structure disposed on second head portion rotational component 713, as described further herein. In some embodiments, rotational components do not include gear structures, such as gear structure 715. As shown, at least a segment of first head portion rotational component 710 extends into a first top opening (similar to first top opening 215) of the head portion such that first implement 716 extends from the head portion. The head component also includes first neck portion rotational component 718 (e.g., a pulley component) operably disposed at least proximal to the neck portion of housing component 904. First neck portion rotational component 718 is similar to first head portion rotational component 710, but lacks first implement 716 in the embodiment shown. First neck portion rotational component 718 is configured to rotate completely around a first neck portion rotational axis (similar to first neck portion rotational axis 220). First neck portion rotational component 718 comprises spherical projection receiving areas 714 (structured essentially the same as spherical projection receiving areas 714 of first head portion rotational component 710 in some embodiments).

Figure 10A:
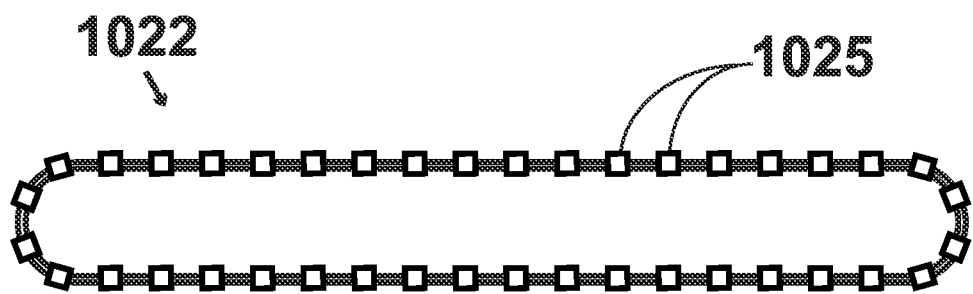
FIG. 10A schematically shows a band component from a top view according to one embodiment.
Figure 10B:
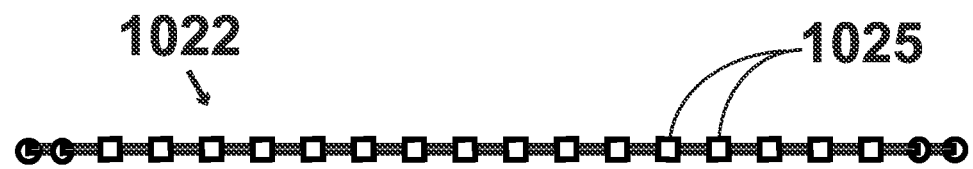
FIG. 10B schematically illustrates the band component of FIG. 10A from a side view.
Figure 12A:
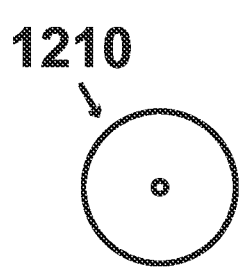
FIG. 12A schematically illustrates a rotational component (e.g., a fluid driven head portion rotational component) from a bottom view according to one embodiment.
Figure 12B:
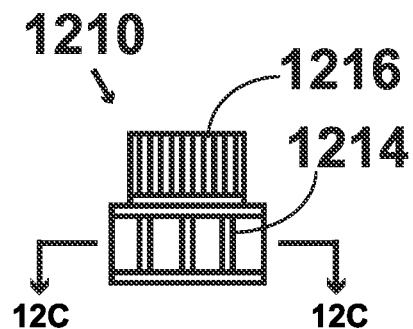
FIG. 12B schematically shows the rotational component of FIG. 12A from a side view.
Figure 12C:
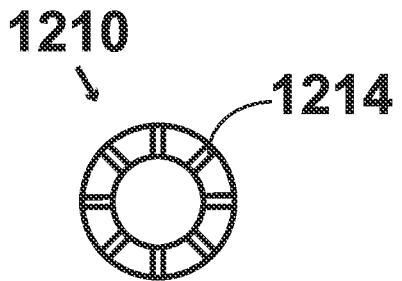
FIG. 12C schematically depicts the rotational component of FIG. 12A from a sectional view.
Figure 12D:
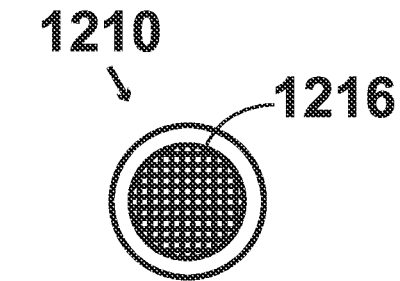
FIG. 12D schematically depicts the rotational component of FIG. 12A from a top view.

As also shown, device 900 also includes band component 722, which comprises a plurality of at least partially spherical projections 725. As referenced herein, first head portion rotational component 710 and first neck portion rotational component 718 each comprise spherical projection receiving areas 714 that are structured to receive at least portions of spherical projections 725 such that when first neck portion rotational component 718 rotates in a first direction, band component 722 and first head portion rotational component 710 rotate in the first direction or when first neck portion rotational component 718 rotates in a second direction, band component 722 and first head portion rotational component 710 rotate in the second direction when spherical projection receiving areas 714 receive at least the portions of spherical projections 725 and at least spherical projections 725 engage first head portion rotational component 710 and first neck portion rotational component 718. Projections and projection receiving areas optionally have other corresponding shapes. In some embodiments, for example, projections and projections receiving areas have corresponding cross-sectional shapes, such as squares, triangles, ovals, regular n-sided polygons, irregular n-sided polygons, or the like. In some embodiments, the devices of the present disclosure include band components having substantially disk-shaped projections and projection receiving areas that have corresponding shapes that receive and engage the substantially disk-shaped projections. To illustrate, FIGS. 10A and 10B schematically show band component 1022 that includes substantially disk-shaped projections 1025.

As also shown, the top area of the head component further comprises a second top opening (similar to second top opening 217). Second head portion rotational component 713 (e.g., a pulley component) is operably disposed at least partially in the head portion of housing component 904.

Second head portion rotational component 713 is configured to rotate completely around a second rotational axis (similar to second rotational axis 215). Second head portion rotational component 713 comprises spherical projection receiving areas 714 (the same as spherical projection receiving areas 714 of first head portion rotational component 710) and second implement 719 (shown as a bristle carrier) that are operably connected to one another. At least a segment of second head portion rotational component 713 extends at least partially into the second top opening of the head portion such that second implement 719 at least partially extends from the head portion. Band component 722 is further operably engaged with spherical projection receiving areas 714 of second head portion rotational component 713 such that when first neck portion rotational component 718 rotates in the first direction, band component 722 and first head portion rotational component 710 rotate in the first direction and second head portion rotational component 713 rotates in the second direction or when first neck portion rotational component 718 rotates in the second direction, band component 722 and first head portion rotational component 710 rotate in the second direction and second head portion rotational component 713 rotates in the first direction. Second head portion rotational component 713 also includes gear structure 715 that meshes with corresponding gear structure 715 disposed on first head portion rotational component 710, as described further herein. In some embodiments, the first direction and the second direction are substantially opposite one another. Band components can be fabricated from various materials or combinations of materials, including metal, rubber, KEVLAR®, fiber glass, plastic, fabric, or the like. In some embodiments, devices are configured similar to device 100 (i.e., only including a single head portion rotational component) using, for example, first neck portion rotational component 718, first head portion rotational component 710, and band component 722.

As also shown, the head component of device 900 comprises at least one channel 727 (two channels 727 are shown) at least partially disposed within housing component 904 in which at least a portion of band component 722 is disposed at least partially within channels 727 and is configured to move through channels 727. As additionally shown, the head component of device 900 also comprises at least one support structure 729 (e.g., an internal divider, wall, rib, or the like) disposed at least partially within housing component 904. In the embodiment shown, support structure 729 is disposed at least partially between the two channels 727 disposed within housing component 904. In some embodiments, support structure 729 is formed to provide structural support to housing component 904, such that housing component 904 maintains structural integrity and rigidity during the use of device 900.

Device 900 includes second gear component 226 (e.g., a bevel gear component, a spur gear component, etc.) operably connected, or reversibly connectable, to first neck portion rotational component 718, and third gear component 228 (e.g., a bevel gear component, a spur gear component, etc.) is operably connected, or reversibly connectable, to second gear component 226. Exemplary gears that are optionally adapted for use with the components, devices, and related applications of the present disclosure are also described in, e.g., Dudley, Handbook of Practical Gear Design (Mechanical Engineering Series), CRC Press, 1st Ed. (1994) and Litvin and Fuentes, Gear Geometry and Applied Theory, Cambridge University Press; 2nd Ed. (2004), which are both incorporated herein in their entirety for all purposes.

As also shown, device 900 also includes a handle component (similar to handle component 230 in some embodiments) operably connected, or connectable, to the head component of device 900. In some embodiments, the head component and the handle component are fabricated integral with one another. In some embodiments, the head component is reversibly connectable to the handle component, for example, similar the embodiment shown in FIGS. 6A and 6B. The handle component comprises motor component 232 operably connected, or reversibly connectable, to power source 234 (e.g., a rechargeable battery (e.g., via induction charging), disposable battery, a separate power outlet, etc.) and to third gear component 228 (via a rotational shaft in the embodiment shown) such that when motor component 232 effects rotation of third gear component 228, second gear component 226, first neck portion rotational component 718, first head portion rotational component 710, and band component 722 rotate in the first direction and second head portion rotational component 713 rotates in the second direction, when third gear component 228 is operably connected to second gear component 226 and when second gear component 226 is operably connected to first neck portion rotational component 718. As shown, the handle component also includes switch 736 operably connected to motor component 232 to control the operation of motor component 232.

In some embodiments, the rotational components comprise resilient coupling components that resiliently couple the implement directly or indirectly to head portion gear components. Additional details regarding resilient coupling components that are optionally adapted for use with the head components and devices disclosed herein are described, for example, in U.S. Patent Application Publication No. US 2016/0305507, titled "ROTARY UNITS, ROTARY MECHANISMS, AND RELATED APPLICATIONS," filed Oct. 20, 2016 by Sappenfield, which incorporated by reference in its entirety.

The present disclosure also provides various fluid driven devices, head components, and related methods in which fluids (e.g., a liquid-phase or a gas-phase fluid) are used to effect the rotation of rotational components. Aspects of these embodiments are schematically shown, for example, in FIGS. 12A-12D, 13, 14A, 14B, 15, 16A-16C, 17, and 18. As shown, device 1300 includes head component 1302, which includes head portion 1306 and neck portion 1308 that are operably connected, or connectable, to one another. Head portion 1306 comprises at least a top area that comprises at least first top opening 1315. Head component 1302 also includes first head portion rotational component 1210 operably disposed at least partially in head portion 1306 of head housing component 1311. First head portion rotational component 1210 is configured to rotate at least partially around first head portion rotational axis 1320. First head portion rotational component 1210 comprises first implement 1216 (shown as a bristle carrier). As shown, a segment of first head portion rotational component 1210 extends through first top opening 1315 of head portion 1306 such that first implement 1216 at least partially extends from head portion 1306. Head component 1302 also includes first channel 1313 at least partially disposed in neck portion 1308 of head housing component 1311. First channel 1313 fluidly communicates with at least a portion of first head portion rotational component 1210 (i.e., impeller structure 1214). Device 1300 also includes handle component 1330 operably connected, or connectable, to head component 1302. Handle component 1330 comprises handle housing component 1331. Fluid container 1332 (e.g., a compressed gas tank) is at least partially disposed in handle housing component 1331. Fluid container 1332 is operably connected, or connectable, to first channel 1313 such that when fluid (e.g., a gas or a liquid) flows from fluid container 1332 (shown as being substantially completely disposed in handle housing component 1313) through first channel 1313, first head portion rotational component 1210 rotates at least partially around first head portion rotational axis 1320. Device 1300 typically comprises an operably connected switch or valve mechanism 1341 that is configured to selectively effect the fluid to flow fluid container 1332 through first channel 1313. As also shown, fluid container 1332 is configured to reversibly fluidly communicate with fluid replenishing station 1347 (e.g., an air compressor or other gas compressor apparatus) that is structured to replenish fluid in fluid container 1332 via valve or port 1345.

Figure 18:
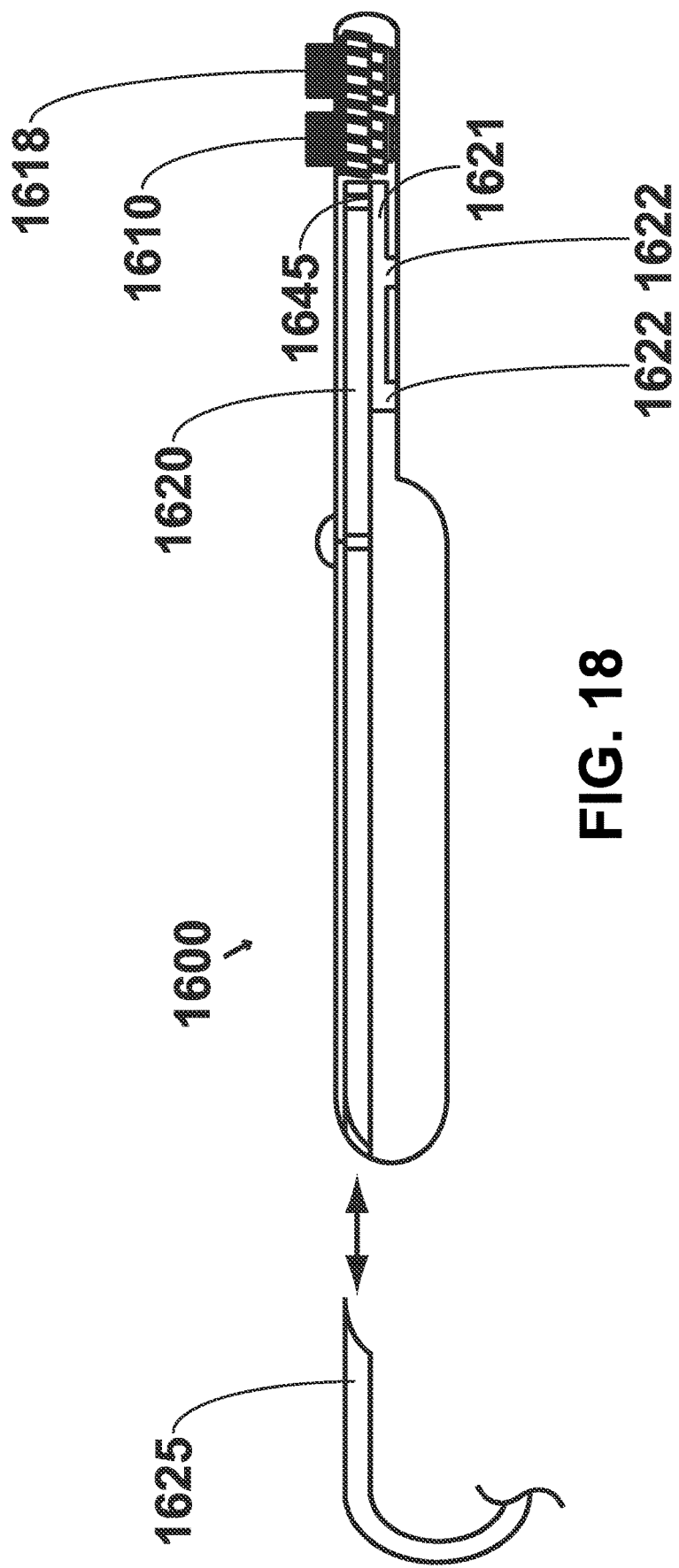
FIG. 18 schematically illustrates a fluid driven device that is connectable to a fluid source that is disposed external to the device from a transparent side view according to one embodiment.

The top area of head components of the present disclosure optionally further comprises at least a second top opening (schematically shown, for example, in FIGS. 17 and 18). A second head portion rotational component 1618 is shown operably disposed at least partially in the head portion of the head housing component. Second head portion rotational component 1618 is configured to counter-rotate relative to first head portion rotational component 1610. In the embodiment shown, second head portion rotational component 1618 is structured the same as first head portion rotational component 1610. First head portion rotational component 1610 includes impellers 1614 (shown as primary and secondary impellers) and implement 1616. Second head portion rotational component 1618 is configured to rotate at least partially around a second head portion rotational axis. As shown, at least a portion of first head portion rotational component 1610 is operably engaged with at least a portion of second head portion rotational component 1618 such that when the fluid flows from a fluid container or other fluid source through first channel 1620, first head portion rotational component 1610 and second head portion rotational component 1618 rotate in directions that are substantially opposite one another, because impeller structures of first head portion rotational component 1610 and second head portion rotational component 1618 operably engage one another during operation.

The head component comprises second channel 1621 and/or one In some embodiments or more vent openings 1622 configured to receive exhaust fluid from first head portion rotational component 1610 when the fluid flows from the fluid container through the first channel (e.g., first channel 1620). In some embodiments, the head component comprises one or more exhaust fluid fins 1623 that are configured to direct the exhaust fluid from first head portion rotational component 1610 to second channel 1620 and/or vent openings 1622 when the fluid flows from the fluid container through first channel 1620. In some embodiments, first channel (e.g., first channel 1620) comprises one or more openings (e.g., manifold structure 1645 having one or more openings of first channel 1620) disposed proximal to first head portion rotational component 1610 that direct the fluid toward the first head portion rotational component 1610 when the fluid flows from the fluid container through the first channel to effect rotation of at least first head portion rotational component 1610. As shown, first head portion rotational component 1610 and second head portion rotational component 1618 each comprise at least one impeller structure that operably engage one another. As additionally shown, the impeller structure of at least first head portion rotational component 1610 comprises at least a primary impeller and at least a secondary impeller. In some embodiments, first head portion rotational component 1610 and second head portion rotational component 1618 each comprise at least one gear component that operably engage one another.

Typically, the fluid containers of the fluid driven devices of the present disclosure comprise a fluid. In some embodiments, the fluid comprises a gas. In some embodiments, the gas is at least partially compressed (e.g., compressed air or the like). In some embodiments, the fluid comprises a liquid (e.g., liquid-phase water or the like).

Figure 14A:
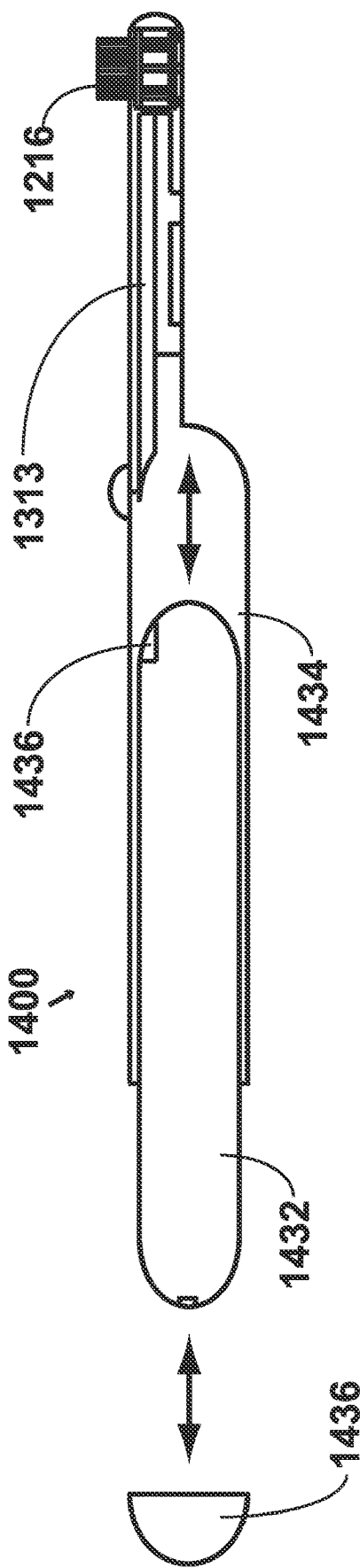
FIG. 14A schematically illustrates a fluid driven device with a removable fluid container from a transparent side view according to one embodiment.
Figure 14B:
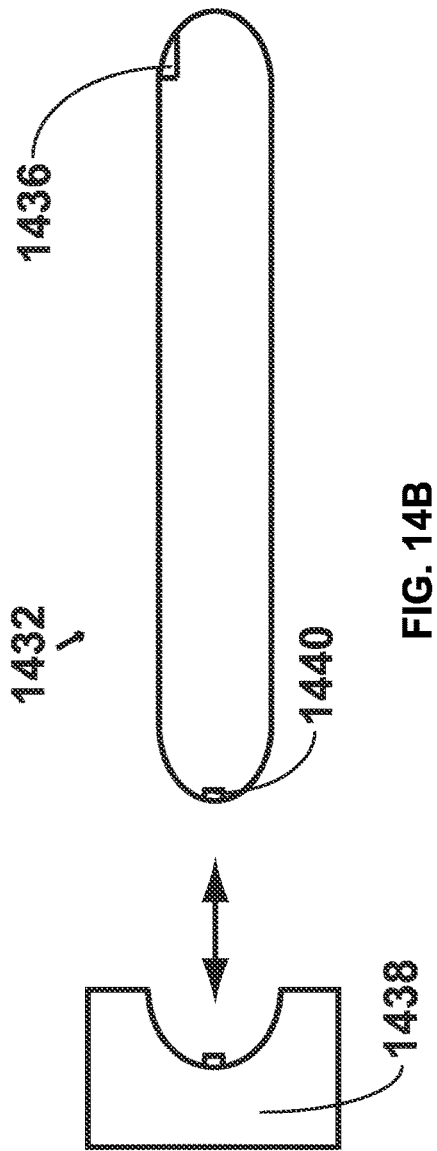
FIG. 14B schematically illustrates the removable fluid container from the device of FIG. 14A and a fluid replenishing station from side views according to one embodiment.
Figure 15:
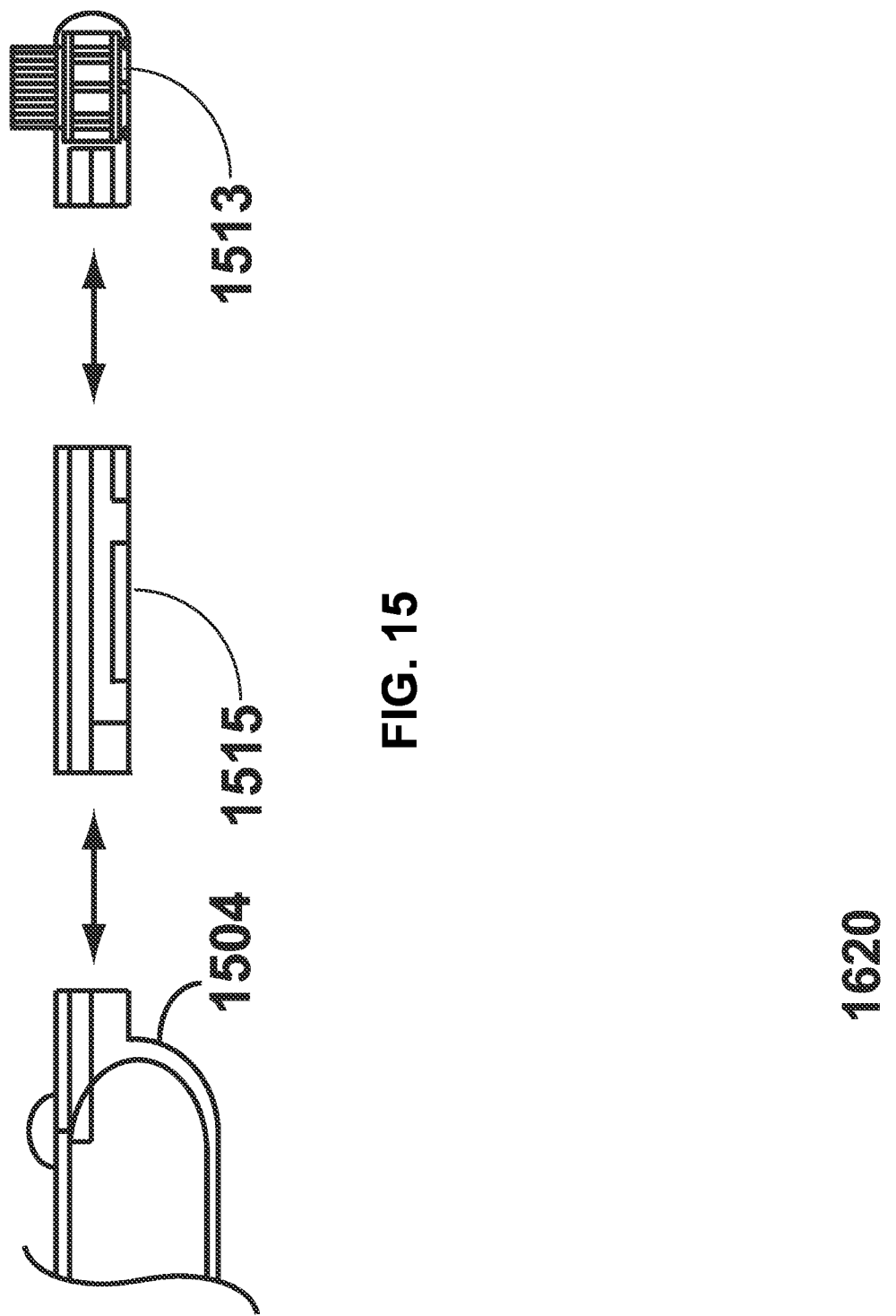
FIG. 15 schematically illustrates aspects of a fluid driven device having removable neck and head portions from a transparent side view according to one embodiment.

In some embodiments, as shown in FIGS. 14A and 14B, for example, device 1400 fluid container 1432 is removable from handle housing component 1434, once handle cap component 1436 is removed from device 1400. First channel 1313 is configured to fluidly communicate with fluid container 1432 via valve or port 1436 which is configured to operably connect to a switch or valve mechanism of device 1400. As also shown, fluid container 1432 is configured to reversibly fluidly communicate with fluid replenishing station 1438 (e.g., an air compressor or other gas compressor apparatus) that is structured to replenish fluid in fluid container 1432 via valve or port 1440. In some embodiments, fluid driven device of the present disclosure do not include fluid containers. In some of these embodiments, such as shown in FIG. 18, for example, first fluid channels (e.g., 1620 of device 1600) are configured to reversibly fluidly communicate with an external fluid source (e.g., an air compressor or other gas compressor apparatus) via reversibly connectable tube component 1625.

Figure 13:
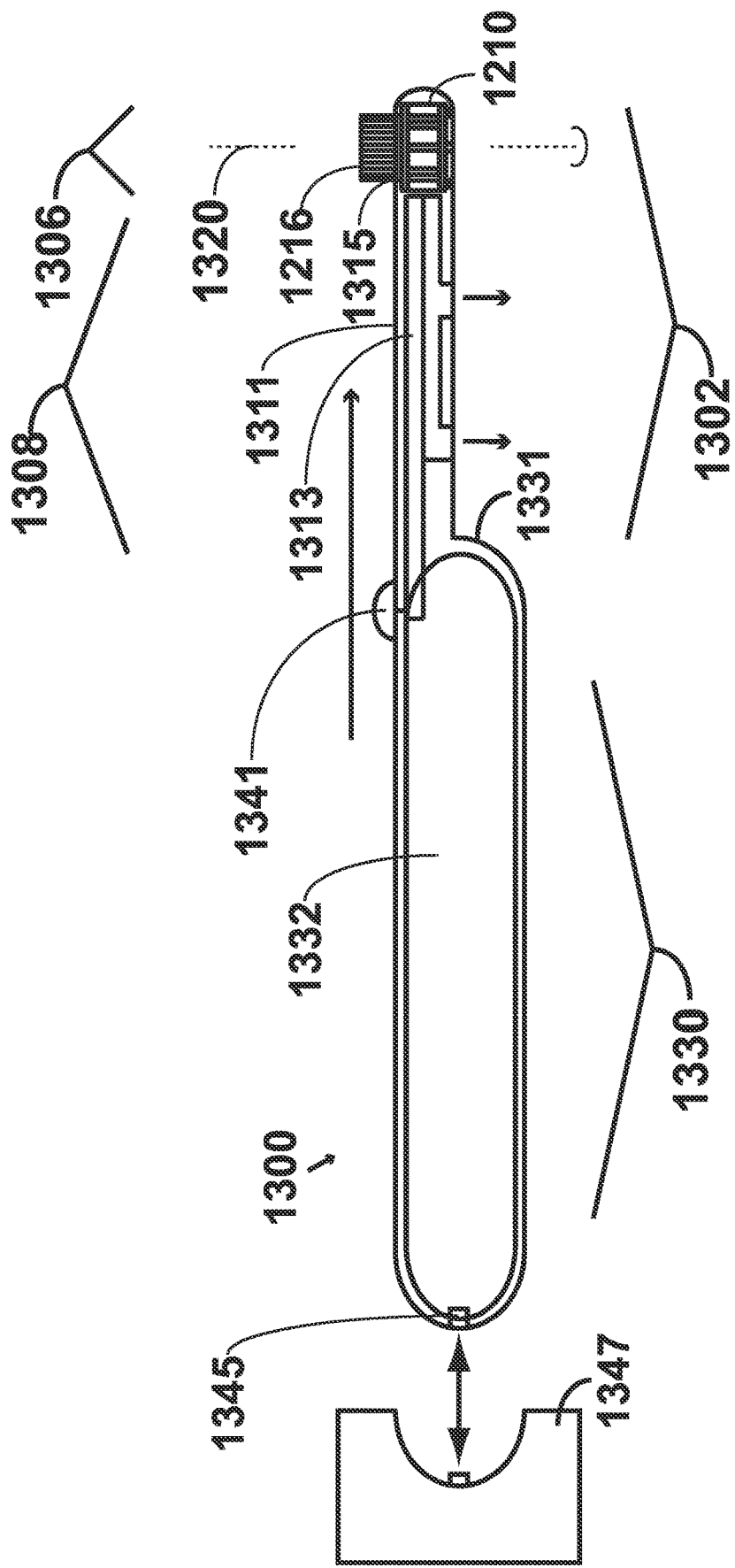
FIG. 13 schematically illustrates a fluid driven device from a transparent side view according to one embodiment.

In some embodiments, as shown, for example, in FIG. 13, head component 1302 and the handle component 1330 are fabricated integral with one another. In some embodiments, as shown, for example, in FIG. 15, head component 1513 is reversibly connectable to handle component 1504 via reversibly connectable neck portion 1515 of the head component.

In some embodiments, devices of the present disclosure comprise dental devices. In some embodiments, the dental devices comprise toothbrushes (e.g., electric toothbrushes). In some embodiments, the device implements are from, for example, a prophy cup, a bristle component, a flossing component, a polishing component, and a combination of two or more thereof. In some embodiments, devices are configured as household or industrial devices having implements selected from, for example, a cleaning component, a polishing component, a sanding component, and a scrubbing component.

The present disclosure also provides various methods, including methods of operating and/or manufacturing the devices disclosed herein. In some embodiments, for example, the present disclosure provides a method of operating a device. The method includes rotating a first neck portion rotational component of the device, which first neck portion rotational component is operably engaged with a band component that is operably engaged with a first head portion rotational component that comprises at least a first implement such that the first head portion rotational component and the first implement rotate completely around a first head portion rotational axis in a first direction, thereby operating the device. In some embodiments, the method further comprises rotating a second head portion rotational component of the device, which second head portion rotational component comprises at least a second implement and which second head portion rotational component is operably engaged with the band component such that the second head portion rotational component and the second implement rotate completely around a second head portion rotational axis in a second direction. In some embodiments, the first and second implements comprise dental implements and the method further comprises contacting the first implement and/or the second implement with one or more teeth and/or dental appliances of a subject.

Device components (e.g., head components, handle components, drive mechanism components, gear components, shafts, rotational components, device housings, etc.) are optionally formed by various fabrication techniques or combinations of such techniques including, e.g., cast molding, stamping, machining, embossing, extrusion, engraving, injection molding, etching (e.g., electrochemical etching, etc.), or other techniques. These and other suitable fabrication techniques are generally known in the art and described in, e.g., Molinari et al. (Eds.), Metal Cutting and High Speed Machining, Kluwer Academic Publishers (2002), Altintas, Manufacturing Automation: Metal Cutting Mechanics, Machine Tool Vibrations, and CNC Design, Cambridge University Press (2000), Stephenson et al., Metal Cutting Theory and Practice, Marcel Dekker (1997), Fundamentals of Injection Molding, W. J. T. Associates (2000), Whelan, Injection Molding of Thermoplastics Materials, Vol. 2, Chapman & Hall (1991), Rosato, Injection Molding Handbook, $3^{rd}$ Ed., Kluwer Academic Publishers (2000), Fisher, Extrusion of Plastics, Halsted Press (1976), and Chung, Extrusion of Polymers: Theory and Practice, Hanser-Gardner Publications (2000), which are each incorporated by reference. Exemplary materials optionally used to fabricate device components include, e.g., metal, glass, wood, polymethylmethacrylate, polyethylene, polydimethylsiloxane, polyetheretherketone, polytetrafluoroethylene, polystyrene, polyvinylchloride, polypropylene, polysulfone, polymethylpentene, and polycarbonate, among many others. In certain embodiments, following fabrication, device components are optionally further processed, e.g., by painting, coating surfaces with a hydrophilic coating, a hydrophobic coating, or the like.

Some further aspects are also defined in the following clauses:

Clause 1: A device, comprising: a head component that comprises: a head housing component comprising a head portion and a neck portion that are operably connected to one another, wherein the head portion comprises at least a top area that comprises at least a first top opening; a first head portion rotational component operably disposed at least partially in the head portion of the head housing component, wherein the first head portion rotational component is configured to rotate completely around a first head portion rotational axis, wherein the first head portion rotational component comprises at least a first implement, and wherein at least a segment of the first head portion rotational component extends at least partially into and/or through the first top opening of the head portion such that the first implement at least partially extends from the head portion; a first neck portion rotational component operably disposed at least proximal to the neck portion of the head housing component, wherein the first neck portion rotational component is configured to rotate completely around a first neck portion rotational axis; a band component operably engaged with the first head portion rotational component and the first neck portion rotational component such that when the first neck portion rotational component rotates in a first direction, the band component and the first head portion rotational component rotate in the first direction or when the first neck portion rotational component rotates in a second direction, the band component and the first head portion rotational component rotate in the second direction; a rotational mechanism operably connected, or reversibly connectable, to the first neck portion rotational component; and, a handle component operably connected, or connectable, to the head component, which handle component comprises a handle housing component that comprises a motor component operably connected, or reversibly connectable, to a power source and to the rotational mechanism such that when the motor component effects rotation of the rotational mechanism, the first neck portion rotational component, the first head portion rotational component, and the band component rotate in the first direction or in the second direction when the rotational mechanism is operably connected to the first neck portion rotational component.

Clause 2: The device of Clause 1, wherein: the first head portion rotational component comprises at least a first head portion gear component operably connected to the first implement; the first neck portion rotational component comprises at least a first neck portion gear component; the band component is operably engaged with the first head portion gear component of the first head portion rotational component and the first neck portion gear component of the first neck portion rotational component such that when the first neck portion rotational component rotates in the first direction, the band component and the first head portion rotational component rotate in the first direction or when the first neck portion rotational component rotates in the second direction, the band component and the first head portion rotational component rotate in the second direction; a second gear component is operably connected, or reversibly connectable, to the first neck portion rotational component; a third gear component is operably connected, or reversibly connectable, to the second gear component; and, the motor component is operably connected, or reversibly connectable, to the power source and to the third gear component such that when the motor component effects rotation of the third gear component, the second gear component, the first neck portion rotational component, the first head portion rotational component, and the band component rotate in the first direction or in the second direction when the third gear component is operably connected to the second gear component and when the second gear component is operably connected to the first neck portion rotational component.

Clause 3: The device of Clause 1 or Clause 2, wherein the first head portion rotational component and the first neck portion rotational component each comprise a pulley component.

Clause 4: The device of any one of Clauses 1-3, wherein the head component comprises at least one channel at least partially disposed within the head housing component and wherein at least a portion of the band component is disposed at least partially within the channel and is configured to move through the channel.

Clause 5: The device of any one of Clauses 1-4, wherein the head component comprises at least two channels at least partially disposed within the head housing component and wherein the band component is disposed at least partially within the channels and is configured to move through the channels.

Clause 6: The device of any one of Clauses 1-5, wherein the head component comprises at least one support structure disposed at least partially within the head housing component.

Clause 7: The device of any one of Clauses 1-6, wherein the support structure is disposed at least partially between the channels.

Clause 8: The device of any one of Clauses 1-7, wherein the band component comprises a plurality of at least partially spherical or substantially disk-shaped projections.

Clause 9: The device of any one of Clauses 1-8, wherein the first head portion rotational component and the first neck portion rotational component each comprise spherical or substantially disk-shaped projection receiving areas that are structured to receive at least portions of the spherical or the substantially disk-shaped projections such that when the first neck portion rotational component rotates in a first direction, the band component and the first head portion rotational component rotate in the first direction or when the first neck portion rotational component rotates in a second direction, the band component and the first head portion rotational component rotate in the second direction when the spherical or substantially disk-shaped projection receiving areas receive at least the portions of the spherical or substantially disk-shaped projections and at least the spherical or substantially disk-shaped projections engage the first head portion rotational component and the first neck portion rotational component.

Clause 10: The device of any one of Clauses 1-9, wherein the top area of the head component further comprises at least a second top opening, wherein a second head portion rotational component is operably disposed at least partially in the head portion of the head housing component, wherein the second head portion rotational component is configured to rotate completely around a second rotational axis, wherein the second head portion rotational component comprises at least a second implement, wherein at least a segment of the second head portion rotational component extends at least partially into and/or through the second top opening of the head portion such that the second implement at least partially extends from the head portion, and wherein the band component is further operably engaged with the second head portion rotational component and/or the first and second head portion rotational components operably engage one another such that when the first neck portion rotational component rotates in the first direction, the band component and the first head portion rotational component rotate in the first direction and the second head portion rotational component rotates in the second direction or when the first neck portion rotational component rotates in the second direction, the band component and the first head portion rotational component rotate in the second direction and the second head portion rotational component rotates in the first direction.

Clause 11: The device of any one of Clauses 1-10, wherein the second head portion rotational component comprises a pulley component.

Clause 12: The device of any one of Clauses 1-11, wherein the first and second head portion rotational components and the first neck portion rotational component each comprise spherical or substantially disk-shaped projection receiving areas that are structured to receive at least portions of the spherical or substantially disk-shaped projections such that when the first neck portion rotational component rotates in a first direction, the band component and the first head portion rotational component rotate in the first direction and the second head portion rotational component rotates in the second direction or when the first neck portion rotational component rotates in a second direction, the band component and the first head portion rotational component rotate in the second direction and the second head portion rotational component rotates in the first direction when the spherical or substantially disk-shaped projection receiving areas receive at least the portions of the spherical or substantially disk-shaped projections and at least the spherical or substantially disk-shaped projections engage the first and second head portion rotational components and the first neck portion rotational component.

Clause 13: The device of any one of Clauses 1-12, wherein the first and second head portion rotational components each comprise gear structures that mesh with one another when the first and second head portion rotational components rotate relative to one another.

Clause 14: The device of any one of Clauses 1-13, wherein the head component and the handle component are fabricated integral with one another.

Clause 15: The device of any one of Clauses 1-14, wherein the head component is reversibly connectable to the handle component.

Clause 16: The device of any one of Clauses 1-15, wherein a first surface of the band component comprises a first set of projections that engage with the first head portion gear component of the first head portion rotational component and the first neck portion gear component of the first neck portion rotational component.

Clause 17: The device of any one of Clauses 1-16, wherein the top area of the head component further comprises at least a second top opening, wherein a second head portion rotational component is operably disposed at least partially in the head portion of the head housing component, wherein the second head portion rotational component is configured to rotate completely around a second rotational axis, wherein the second head portion rotational component comprises at least a second head portion gear component and at least a second implement that are operably connected to one another, wherein at least a segment of the second head portion rotational component extends at least partially into and/or through the second top opening of the head portion such that the second implement at least partially extends from the head portion, and wherein the band component is further operably engaged with the second head portion gear component and the first head portion gear component and/or the first and second head portion rotational components operably engage one another such that when the first neck portion rotational component rotates in the first direction, the band component and the first head portion rotational component rotate in the first direction and the second head portion rotational component rotates in the second direction or when the first neck portion rotational component rotates in the second direction, the band component and the first head portion rotational component rotate in the second direction and the second head portion rotational component rotates in the first direction.

Clause 18: The device of any one of Clauses 1-17, wherein the first direction and the second direction are substantially opposite one another.

Clause 19: The device of any one of Clauses 1-18, wherein a first surface of the band component comprises a first set of projections that engage with the first head portion gear component of the first head portion rotational component and the first neck portion gear component of the first neck portion rotational component and wherein a second surface of the band component comprises a second set of projections that engage with the second head portion gear component of the second head portion rotational component.

Clause 20: The device of any one of Clauses 1-19, wherein the first head portion rotational component and/or the second head portion rotational component comprises at least one resilient coupling component that resiliently couples the first implement directly or indirectly to the first head portion gear component and/or the second implement directly or indirectly to the second head portion gear component.

Clause 21: The device of any one of Clauses 1-20, wherein the device comprises a dental device.

Clause 22: The device of any one of Clauses 1-21, wherein the dental device comprises a toothbrush.

Clause 23: The device of any one of Clauses 1-22, wherein the first implement and the second implement are independently selected from the group consisting of: a prophy cup, a bristle component, a flossing component, a polishing component, and a combination of two or more thereof.

Clause 24: The device of any one of Clauses 1-23, wherein the first implement and the second implement are independently selected from the group consisting of: a cleaning component, a polishing component, a sanding component, and a scrubbing component.

Clause 25: A head component, comprising: a head housing component comprising a head portion and a neck portion that are operably connected to one another, wherein the head portion comprises at least a top area that comprises at least a first top opening; a first head portion rotational component operably disposed at least partially in the head portion of the head housing component, wherein the first head portion rotational component is configured to rotate completely around a first head portion rotational axis, wherein the first head portion rotational component comprises at least a first implement, and wherein at least a segment of the first head portion rotational component extends at least partially into and/or through the first top opening of the head portion such that the first implement at least partially extends from the head portion; a first neck portion rotational component operably disposed at least proximal to the neck portion of the head housing component, wherein the first neck portion rotational component is configured to rotate completely around a first neck portion rotational axis; and, a band component operably engaged with the first head portion rotational component and the first neck portion rotational component such that when the first neck portion rotational component rotates in a first direction, the band component and the first head portion rotational component rotate in the first direction or when the first neck portion rotational component rotates in a second direction, the band component and the first head portion rotational component rotate in the second direction; wherein the first neck portion rotational component is operably connected, or reversibly connectable, to a rotational mechanism; and wherein the head component is configured to reversibly operably connect to a handle component that comprises a handle housing component that comprises a motor component operably connected, or reversibly connectable, to a power source and to the rotational mechanism such that when the head component is operably connected to the handle component and when the motor component effects rotation of the rotational mechanism, the first neck portion rotational component, the first head portion rotational component, and the band component rotate in the first direction or in the second direction.

Clause 26: The head component of Clause 25, wherein: the first head portion rotational component comprises at least a first head portion gear component operably connected to the first implement; the first neck portion rotational component comprises at least a first neck portion gear component; the band component is operably engaged with the first head portion gear component of the first head portion rotational component and the first neck portion gear component of the first neck portion rotational component such that when the first neck portion rotational component rotates in the first direction, the band component and the first head portion rotational component rotate in the first direction or when the first neck portion rotational component rotates in the second direction, the band component and the first head portion rotational component rotate in the second direction; the first neck portion rotational component is operably connected, or reversibly connectable, to a second gear component; and, the head component is configured to reversibly operably connect to a handle component, which handle component comprises a motor component operably connected, or reversibly connectable, to a power source and to a third gear component, which third gear component is operably connected, or reversibly connectable, to the second gear component such that when the head component is operably connected to the handle component and when the motor component effects rotation of the third gear component, the second gear component, the first neck portion rotational component, the first head portion rotational component, and the band component rotate in the first direction or in the second direction.

Clause 27: The head component of Clause 25 or Clause 26, wherein the first head portion rotational component and the first neck portion rotational component each comprise a pulley component.

Clause 28: The head component of any one of Clauses 25-27, wherein the head component comprises at least one channel at least partially disposed within the head housing component and wherein at least a portion of the band component is disposed at least partially within the channel and is configured to move through the channel.

Clause 29: The head component of any one of Clauses 25-28, wherein the head component comprises at least two channels at least partially disposed within the head housing component and wherein the band component is disposed at least partially within the channels and is configured to move through the channels.

Clause 30: The head component of any one of Clauses 25-29, wherein the head component comprises at least one support structure disposed at least partially within the head housing component.

Clause 31: The head component of any one of Clauses 25-30, wherein the support structure is disposed at least partially between the channels.

Clause 32: The head component of any one of Clauses 25-31, wherein the band component comprises a plurality of at least partially spherical or substantially disk-shaped projections.

Clause 33: The head component of any one of Clauses 25-32, wherein the first head portion rotational component and the first neck portion rotational component each comprise spherical or substantially disk-shaped projection receiving areas that are structured to receive at least portions of the spherical or substantially disk-shaped projections such that when the first neck portion rotational component rotates in a first direction, the band component and the first head portion rotational component rotate in the first direction or when the first neck portion rotational component rotates in a second direction, the band component and the first head portion rotational component rotate in the second direction when the spherical or substantially disk-shaped projection receiving areas receive at least the portions of the spherical or substantially disk-shaped projections and at least the spherical or substantially disk-shaped projections engage the first head portion rotational component and the first neck portion rotational component.

Clause 34: The head component of any one of Clauses 25-33, wherein the top area of the head component further comprises at least a second top opening, wherein a second head portion rotational component is operably disposed at least partially in the head portion of the head housing component, wherein the second head portion rotational component is configured to rotate completely around a second rotational axis, wherein the second head portion rotational component comprises at least a second implement, wherein at least a segment of the second head portion rotational component extends at least partially into and/or through the second top opening of the head portion such that the second implement at least partially extends from the head portion, and wherein the band component is further operably engaged with the second head portion rotational component and/or the first and second head portion rotational components operably engage one another such that when the first neck portion rotational component rotates in the first direction, the band component and the first head portion rotational component rotate in the first direction and the second head portion rotational component rotates in the second direction or when the first neck portion rotational component rotates in the second direction, the band component and the first head portion rotational component rotate in the second direction and the second head portion rotational component rotates in the first direction.

Clause 35: The head component of any one of Clauses 25-34, wherein the second head portion rotational component comprises a pulley component.

Clause 36: The head component of any one of Clauses 25-35, wherein the band component comprises a plurality of at least partially spherical or substantially disk-shaped projections, wherein the first and second head portion rotational components and the first neck portion rotational component each comprise spherical or substantially disk-shaped projection receiving areas that are structured to receive at least portions of the spherical or substantially disk-shaped projections such that when the first neck portion rotational component rotates in a first direction, the band component and the first head portion rotational component rotate in the first direction and the second head portion rotational component rotates in the second direction or when the first neck portion rotational component rotates in a second direction, the band component and the first head portion rotational component rotate in the second direction and the second head portion rotational component rotates in the first direction when the spherical or substantially disk-shaped projection receiving areas receive at least the portions of the spherical or substantially disk-shaped projections and at least the spherical or substantially disk-shaped projections engage the first and second head portion rotational components and the first neck portion rotational component.

Clause 37: The head component of any one of Clauses 25-36, wherein the first and second head portion rotational components each comprise gear structures that mesh with one another when the first and second head portion rotational components rotate relative to one another.

Clause 38: The head component of any one of Clauses 25-37, wherein a first surface of the band component comprises a first set of projections that engage with the first head portion gear component of the first head portion rotational component and the first neck portion gear component of the first neck portion rotational component.

Clause 39: The head component of any one of Clauses 25-38, wherein the top area of the head component further comprises at least a second top opening, wherein a second head portion rotational component is operably disposed at least partially in the head portion of the head housing component, wherein the second head portion rotational component is configured to rotate completely around a second rotational axis, wherein the second head portion rotational component comprises at least a second head portion gear component and at least a second implement that are operably connected to one another, wherein at least a segment of the second head portion rotational component extends at least partially into and/or through the second top opening of the head portion such that the second implement at least partially extends from the head portion, and wherein the band component is further operably engaged with the second head portion gear component and the first head portion gear component and/or the first and second head portion rotational components operably engage one another such that when the first neck portion rotational component rotates in the first direction, the band component and the first head portion rotational component rotate in the first direction and the second head portion rotational component rotates in the second direction or when the first neck portion rotational component rotates in the second direction, the band component and the first head portion rotational component rotate in the second direction and the second head portion rotational component rotates in the first direction.

Clause 40: The head component of any one of Clauses 25-39, wherein the first direction and the second direction are substantially opposite one another.

Clause 41: The head component of any one of Clauses 25-40, wherein a first surface of the band component comprises a first set of projections that engage with the first head portion gear component of the first head portion rotational component and the first neck portion gear component of the first neck portion rotational component and wherein a second surface of the band component comprises a second set of projections that engage with the second head portion gear component of the second head portion rotational component.

Clause 42: The head component of any one of Clauses 25-41, wherein the first implement and the second implement are independently selected from the group consisting of: a prophy cup, a bristle component, a flossing component, a polishing component, and a combination of two or more thereof.

Clause 43: A device comprising the head component of any one of Clauses 25-42.

Clause 44: A device, comprising: a head component that comprises: a head housing component comprising a head portion and a neck portion that are operably connected, or connectable, to one another, wherein the head portion comprises at least a top area that comprises at least a first top opening; a first head portion rotational component operably disposed at least partially in the head portion of the head housing component, wherein the first head portion rotational component is configured to rotate at least partially around a first head portion rotational axis, wherein the first head portion rotational component comprises at least a first implement, and wherein at least a segment of the first head portion rotational component extends at least partially into and/or through the first top opening of the head portion such that the first implement at least partially extends from the head portion; and a first channel at least partially disposed in the neck portion of the head housing component, wherein the first channel fluidly communicates with at least a portion of the first head portion rotational component; a handle component operably connected, or connectable, to the head component, which handle component comprises a handle housing component; and, a fluid container at least partially disposed in the handle housing component, which fluid container is operably connected, or connectable, to the first channel such that when fluid flows from the fluid container through the first channel, the first head portion rotational component rotates at least partially around the first head portion rotational axis.

Clause 45: The device of Clause 44, wherein the device comprises an operably connected switch or valve mechanism that is configured to selectively effect the fluid to flow from the fluid container through the first channel.

Clause 46: The device of Clause 44 or Clause 45, wherein the fluid container is substantially completely disposed in the handle housing component.

Clause 47: The device of any one of Clauses 44-46, wherein the first head portion rotational component comprises at least one impeller structure.

Clause 48: The device of any one of Clauses 44-47, wherein the top area of the head component further comprises at least a second top opening, wherein a second head portion rotational component is operably disposed at least partially in the head portion of the head housing component, wherein the second head portion rotational component is configured to rotate at least partially around a second head portion rotational axis, wherein the second head portion rotational component comprises at least a second implement, wherein at least a segment of the second head portion rotational component extends at least partially into and/or through the second top opening of the head portion such that the second implement at least partially extends from the head portion, and wherein at least a portion of the first head portion rotational component is operably engaged with at least a portion of the second head portion rotational component such that when the fluid flows from the fluid container through the first channel, the first head portion rotational component and the second head portion rotational component rotate in directions that are substantially opposite one another.

Clause 49: The device of any one of Clauses 44-48, wherein the head component comprises a second channel and/or one or more vent openings configured to receive exhaust fluid from the first head portion rotational component when the fluid flows from the fluid container through the first channel.

Clause 50: The device of any one of Clauses 44-49, wherein the head component comprises one or more exhaust fluid fins that are configured to direct the exhaust fluid from the first head portion rotational component to the second channel and/or the one or more vent openings when the fluid flows from the fluid container through the first channel.

Clause 51: The device of any one of Clauses 44-50, wherein the first channel comprises one or more openings disposed proximal to the first head portion rotational component that direct the fluid toward the first head portion rotational component when the fluid flows from the fluid container through the first channel to effect rotation of at least the first head portion rotational component.

Clause 52: The device of any one of Clauses 44-51, wherein a manifold structure comprises the one or more openings of the first channel.

Clause 53: The device of any one of Clauses 44-52, wherein the first head portion rotational component and the second head portion rotational component each comprise at least one impeller structure that operably engage one another.

Clause 54: The device of any one of Clauses 44-53, wherein the impeller structure of at least the first head portion rotational component comprises at least a primary impeller and at least a secondary impeller.

Clause 55: The device of any one of Clauses 44-54, wherein the first head portion rotational component and the second head portion rotational component each comprise at least one gear component that operably engage one another.

Clause 56: The device of any one of Clauses 44-55, wherein the fluid container comprises the fluid.

Clause 57: The device of any one of Clauses 44-56, wherein the fluid comprises a gas.

Clause 58: The device of any one of Clauses 44-57, wherein the gas is at least partially compressed.

Clause 59: The device of any one of Clauses 44-58, wherein the fluid comprises a liquid.

Clause 60: The device of any one of Clauses 44-59, wherein the fluid container is removable from the handle housing component.

Clause 61: The device of any one of Clauses 44-60, wherein the fluid container is configured to reversibly fluidly communicate with a fluid replenishing station that is structured to replenish fluid in the fluid container.

Clause 62: The device of any one of Clauses 44-61, wherein the fluid replenishing station comprises a gas compressor apparatus.

Clause 63: The device of any one of Clauses 44-62, wherein the head component and the handle component are fabricated integral with one another.

Clause 64: The device of any one of Clauses 44-63, wherein the head component is reversibly connectable to the handle component.

Clause 65: The device of any one of Clauses 44-64, wherein the head portion of the head component is reversibly connectable to the neck portion of the head component.

Clause 66: The device of any one of Clauses 44-65, wherein the device comprises a dental device.

Clause 67: The device of any one of Clauses 44-66, wherein the dental device comprises a toothbrush.

Clause 68: The device of any one of Clauses 44-67, wherein the first implement and the second implement are independently selected from the group consisting of: a prophy cup, a bristle component, a flossing component, a polishing component, and a combination of two or more thereof.

Clause 69: The device of any one of Clauses 44-68, wherein the first implement and the second implement are independently selected from the group consisting of: a cleaning component, a polishing component, a sanding component, and a scrubbing component.

Clause 70: A head component, comprising: a head housing component comprising a head portion and a neck portion that are operably connected, or connectable, to one another, wherein the head portion comprises at least a top area that comprises at least a first top opening; a first head portion rotational component operably disposed at least partially in the head portion of the head housing component, wherein the first head portion rotational component is configured to rotate at least partially around a first head portion rotational axis, wherein the first head portion rotational component comprises at least a first implement, and wherein at least a segment of the first head portion rotational component extends at least partially into and/or through the first top opening of the head portion such that the first implement at least partially extends from the head portion; and a first channel at least partially disposed in the neck portion of the head housing component, wherein the first channel fluidly communicates with at least a portion of the first head portion rotational component; wherein the head component is configured to reversibly operably connect to a handle component that comprises a handle housing component and to a fluid container at least partially disposed in the handle housing component, which fluid container is configured to reversibly operably connect to the first channel such that when fluid flows from the fluid container through the first channel, the first head portion rotational component rotates at least partially around the first head portion rotational axis.

Clause 71: The head component of Clause 70, wherein the first head portion rotational component comprises at least one impeller structure.

Clause 72: The head component of Clause 70 or Clause 71, wherein the top area of the head component further comprises at least a second top opening, wherein a second head portion rotational component is operably disposed at least partially in the head portion of the head housing component, wherein the second head portion rotational component is configured to rotate at least partially around a second head portion rotational axis, wherein the second head portion rotational component comprises at least a second implement, wherein at least a segment of the second head portion rotational component extends at least partially into and/or through the second top opening of the head portion such that the second implement at least partially extends from the head portion, and wherein at least a portion of the first head portion rotational component is operably engaged with at least a portion of the second head portion rotational component such that when the fluid flows from the fluid container through the first channel, the first head portion rotational component and the second head portion rotational component rotate in directions that are substantially opposite one another.

Clause 73: The head component of any one of Clauses 70-72, wherein the head component comprises a second channel and/or one or more vent openings configured to receive exhaust fluid from the first head portion rotational component when the fluid flows from the fluid container through the first channel.

Clause 74: The head component of any one of Clauses 70-73, wherein the head component comprises one or more exhaust fluid fins that are configured to direct the exhaust fluid from the first head portion rotational component to the second channel and/or the one or more vent openings when the fluid flows from the fluid container through the first channel.

Clause 75: The head component of any one of Clauses 70-74, wherein the first channel comprises one or more openings disposed proximal to the first head portion rotational component that direct the fluid toward the first head portion rotational component when the fluid flows from the fluid container through the first channel to effect rotation of at least the first head portion rotational component.

Clause 76: The head component of any one of Clauses 70-75, wherein a manifold structure comprises the one or more openings of the first channel.

Clause 77: The head component of any one of Clauses 70-76, wherein the first head portion rotational component and the second head portion rotational component each comprise at least one impeller structure that operably engage one another.

Clause 78: The head component of any one of Clauses 70-77, wherein the impeller structure of at least the first head portion rotational component comprises at least a primary impeller and at least a secondary impeller.

Clause 79: The head component of any one of Clauses 70-78, wherein the first head portion rotational component and the second head portion rotational component each comprise at least one gear component that operably engage one another.

Clause 80: The head component of any one of Clauses 70-79, wherein the first implement and the second implement are independently selected from the group consisting of: a prophy cup, a bristle component, a flossing component, a polishing component, and a combination of two or more thereof.

Clause 81: A device comprising the head component of any one of Clauses 70-80.

Clause 82: A device, comprising: a head component that comprises: a head housing component comprising a head portion and a neck portion that are operably connected, or connectable, to one another, wherein the head portion comprises at least a top area that comprises at least a first top opening and at least a second top opening; a first head portion rotational component operably disposed at least partially in the head portion of the head housing component, wherein the first head portion rotational component is configured to rotate at least partially around a first head portion rotational axis, wherein the first head portion rotational component comprises at least a first implement, and wherein at least a segment of the first head portion rotational component extends at least partially into and/or through the first top opening of the head portion such that the first implement at least partially extends from the head portion; a second head portion rotational component operably disposed at least partially in the head portion of the head housing component, wherein the second head portion rotational component is configured to rotate at least partially around a second rotational axis, wherein the second head portion rotational component comprises at least a second implement, and wherein at least a segment of the second head portion rotational component extends at least partially into and/or through the second top opening of the head portion such that the second implement at least partially extends from the head portion; a rotational mechanism operably connected, or reversibly connectable, to the first head portion rotational component and to the second head portion rotational component; and a first channel at least partially disposed in the neck portion of the head housing component, wherein the first channel fluidly communicates with at least a portion of at least the first head portion rotational component; a handle component operably connected, or connectable, to the head component, which handle component comprises a handle housing component; and, a fluid source at least partially disposed in the handle housing component, which fluid source is operably connected, or connectable, to the first channel such that when fluid flows from the fluid source through the first channel, the first head portion rotational component rotates at least partially around the first head portion rotational axis in a first direction and the second head portion rotational component rotates at least partially around the second head portion rotational axis in a second direction or the first head portion rotational component rotates at least partially around the first head portion rotational axis in the second direction and the second head portion rotational component rotates at least partially around the second head portion rotational axis in the first direction.

Clause 83: The device of Clause 82, wherein the device comprises an operably connected switch or valve mechanism that is configured to selectively effect the fluid to flow from the fluid source through the first channel.

Clause 84: The device of Clause 82 or Clause 83, wherein the fluid source comprises a fluid container that is substantially completely disposed in the handle housing component.

Clause 85: The device of any one of Clauses 82-84, wherein the first head portion rotational component comprises at least one impeller structure.

Clause 86: The device of any one of Clauses 82-85, wherein the head component comprises a second channel and/or one or more vent openings configured to receive exhaust fluid from the first head portion rotational component when the fluid flows from the fluid source through the first channel.

Clause 87: The device of any one of Clauses 82-86, wherein the head component comprises one or more exhaust fluid fins that are configured to direct the exhaust fluid from the first head portion rotational component to the second channel and/or the one or more vent openings when the fluid flows from the fluid source through the first channel.

Clause 88: The device of any one of Clauses 82-87, wherein the first channel comprises one or more openings disposed proximal to the first head portion rotational component that direct the fluid toward the first head portion rotational component when the fluid flows from the fluid source through the first channel to effect rotation of at least the head portion rotational component.

Clause 89: The device of any one of Clauses 82-88, wherein a manifold structure comprises the one or more openings of the first channel.

Clause 90: The device of any one of Clauses 82-89, wherein the first head portion rotational component and the second head portion rotational component each comprise at least one impeller structure that operably engage one another.

Clause 91: The device of any one of Clauses 82-90, wherein the impeller structure of at least the first head portion rotational component comprises at least a primary impeller and at least a secondary impeller.

Clause 92: The device of any one of Clauses 82-91, wherein the first head portion rotational component and the second head portion rotational component each comprise at least one gear component that operably engage one another.

Clause 93: The device of any one of Clauses 82-92, wherein the fluid source is disposed at least partially external to the device.

Clause 94: The device of any one of Clauses 82-93, wherein a fluid container comprises the fluid source.

Clause 95: The device of any one of Clauses 82-94, wherein the fluid container comprises the fluid.

Clause 96: The device of any one of Clauses 82-95, wherein the fluid comprises a gas.

Clause 97: The device of any one of Clauses 82-96, wherein the gas is at least partially compressed.

Clause 98: The device of any one of Clauses 82-97, wherein the fluid comprises a liquid.

Clause 99: The device of any one of Clauses 82-98, wherein the fluid container is removable from the handle housing component.

Clause 100: The device of any one of Clauses 82-99, wherein the fluid container is configured to reversibly fluidly communicate with a fluid replenishing station that is structured to replenish fluid in the fluid container.

Clause 101: The device of any one of Clauses 82-100, wherein the fluid replenishing station comprises a gas compressor apparatus.

Clause 102: The device of any one of Clauses 82-101, wherein the head component and the handle component are fabricated integral with one another.

Clause 103: The device of any one of Clauses 82-102, wherein the head component is reversibly connectable to the handle component.

Clause 104: The device of any one of Clauses 82-103, wherein the head portion of the head component is reversibly connectable to the neck portion of the head component.

Clause 105: The device of any one of Clauses 82-104, wherein the device comprises a dental device.

Clause 106: The device of any one of Clauses 82-105, wherein the dental device comprises a toothbrush.

Clause 107: The device of any one of Clauses 82-106, wherein the first implement and the second implement are independently selected from the group consisting of: a prophy cup, a bristle component, a flossing component, a polishing component, and a combination of two or more thereof.

Clause 108: The device of any one of Clauses 82-107, wherein the first implement and the second implement are independently selected from the group consisting of: a cleaning component, a polishing component, a sanding component, and a scrubbing component.

Clause 109: A head component, comprising: a head housing component comprising a head portion and a neck portion that are operably connected, or connectable, to one another, wherein the head portion comprises at least a top area that comprises at least a first top opening and at least a second top opening; a first head portion rotational component operably disposed at least partially in the head portion of the head housing component, wherein the first head portion rotational component is configured to rotate at least partially around a first head portion rotational axis, wherein the first head portion rotational component comprises at least a first implement, and wherein at least a segment of the first head portion rotational component extends at least partially into and/or through the first top opening of the head portion such that the first implement at least partially extends from the head portion; a second head portion rotational component operably disposed at least partially in the head portion of the head housing component, wherein the second head portion rotational component is configured to rotate at least partially around a second rotational axis, wherein the second head portion rotational component comprises at least a second implement, and wherein at least a segment of the second head portion rotational component extends at least partially into and/or through the second top opening of the head portion such that the second implement at least partially extends from the head portion; a rotational mechanism operably connected, or reversibly connectable, to the first head portion rotational component and to the second head portion rotational component; and a first channel at least partially disposed in the neck portion of the head housing component, wherein the first channel fluidly communicates with at least a portion of at least the first head portion rotational component; wherein the head component is configured to reversibly operably connect to a handle component that comprises a handle housing component and to a fluid source at least partially disposed in the handle housing component, which fluid source is configured to reversibly operably connect to the first channel such that when fluid flows from the fluid source through the first channel, the first head portion rotational component rotates at least partially around the first head portion rotational axis in a first direction and the second head portion rotational component rotates at least partially around the second head portion rotational axis in a second direction or the first head portion rotational component rotates at least partially around the first head portion rotational axis in the second direction and the second head portion rotational component rotates at least partially around the second head portion rotational axis in the first direction.

Clause 110: The head component of Clause 109, wherein the first head portion rotational component comprises at least one impeller structure.

Clause 111: The head component of Clause 109 or Clause 110, wherein the head component comprises a second channel and/or one or more vent openings configured to receive exhaust fluid from the first head portion rotational component when the fluid flows from the fluid source through the first channel.

Clause 112: The head component of any one of Clauses 109-111, wherein the head component comprises one or more exhaust fluid fins that are configured to direct the exhaust fluid from the first head portion rotational component to the second channel and/or the one or more vent openings when the fluid flows from the fluid source through the first channel.

Clause 113: The head component of any one of Clauses 109-112, wherein the first channel comprises one or more openings disposed proximal to the first head portion rotational component that direct the fluid toward the first head portion rotational component when the fluid flows from the fluid source through the first channel to effect rotation of at least the head portion rotational component.

Clause 114: The head component of any one of Clauses 109-113, wherein a manifold structure comprises the one or more openings of the first channel.

Clause 115: The head component of any one of Clauses 109-114, wherein the first head portion rotational component and the second head portion rotational component each comprise at least one impeller structure that operably engage one another.

Clause 116: The head component of any one of Clauses 109-115, wherein the impeller structure of at least the first head portion rotational component comprises at least a primary impeller and at least a secondary impeller.

Clause 117: The head component of any one of Clauses 109-116, wherein the first head portion rotational component and the second head portion rotational component each comprise at least one gear component that operably engage one another.

Clause 118: The head component of any one of Clauses 109-117, wherein the first implement and the second implement are independently selected from the group consisting of: a prophy cup, a bristle component, a flossing component, a polishing component, and a combination of two or more thereof.

Clause 119: A device comprising the head component of any one of Clauses 109-118.

Clause 120: A method of operating a device, the method comprising rotating a first neck portion rotational component of the device, which first neck portion rotational component is operably engaged with a band component that is operably engaged with a first head portion rotational component that comprises at least a first implement such that the first head portion rotational component and the first implement rotate completely around a first head portion rotational axis in a first direction, thereby operating the device.

Clause 121: The method of Clause 120, further comprising rotating a second head portion rotational component of the device, which second head portion rotational component comprises at least a second implement and which second head portion rotational component is operably engaged with the band component such that the second head portion rotational component and the second implement rotate completely around a second head portion rotational axis in a second direction.

Clause 122: The method of Clause 120 or Clause 121, wherein the first and second implements comprise dental implements and wherein the method further comprises contacting the first dental implement and/or the second dental implement with one or more teeth and/or dental appliances of a subject.

Clause 123: A method of operating a device, the method comprising flowing a fluid through a first channel at least partially disposed in a neck portion of a head housing component of the device, which first channel fluidly communicates with at least a portion of at least a first head portion rotational component operably disposed at least partially in the head housing component, which first head portion rotational component operably engages a second head portion rotational component operably disposed at least partially in the head housing component such that the first head portion rotational component and the second head portion rotational component rotate in directions that are substantially opposite one another, wherein the first head portion rotational component comprises at least a first implement that at least partially extends from the head housing component of the device and wherein the second head portion rotational component comprises at least a second implement that at least partially extends from the head housing component of the device.

Clause 124: The method of Clause 123, comprising flowing the fluid through the first channel from a fluid container disposed in a handle housing component of the device.

Clause 125: The method of Clause 123 or Clause 124, wherein the first and second implements comprise dental implements and wherein the method further comprises contacting the first dental implement and/or the second dental implement with one or more teeth and/or dental appliances of a subject.

While the foregoing invention has been described in some detail for purposes of clarity and understanding, it will be clear to one skilled in the art from a reading of this disclosure that various changes in form and detail can be made without departing from the true scope of the invention. For example, all the techniques and apparatus described above can be used in various combinations. All publications, patents, patent applications, and/or other documents cited in this application are incorporated by reference in their entirety for all purposes to the same extent as if each individual publication, patent, patent application, and/or other document were individually indicated to be incorporated by reference for all purposes.

What is claimed is:

1. A device, comprising:
a head component that comprises:
a head housing component comprising a head portion and a neck portion that are operably connected to one another, wherein the head portion comprises at least a top area that comprises at least a first top opening and at least a second top opening;
a first head portion rotational component operably disposed at least partially in the head portion of the head housing component, wherein the first head portion rotational component is configured to rotate completely around a first head portion rotational axis, wherein the first head portion rotational component comprises at least a first implement, and wherein at least a segment of the first head portion rotational component extends at least partially into and/or through the first top opening of the head portion such that the first implement at least partially extends from the head portion;
a second head portion rotational component operably disposed at least partially in the head portion of the head housing component, wherein the second head portion rotational component is configured to rotate completely around a second head portion rotational axis, wherein the first head portion rotational axis and the second head portion rotational axis are different from one another, wherein the second head portion rotational component comprises at least a second implement, wherein at least a segment of the second head portion rotational component extends at least partially into and/or through the second top opening of the head portion such that the second implement at least partially extends from the head portion;
a first neck portion rotational component operably disposed at least proximal to the neck portion of the head housing component, wherein the first neck portion rotational component is configured to rotate completely around a first neck portion rotational axis;
a band component operably engaged with the first head portion rotational component and the first neck portion rotational component, and wherein the band component is further operably engaged with the second head portion rotational component and/or the first and second head portion rotational components operably engage one another, such that when the first neck portion rotational component rotates in a first direction, the band component and the first head portion rotational component rotate in the first direction and the second head portion rotational component rotates in a second direction or when the first neck portion rotational component rotates in the second direction, the band component and the first head portion rotational component rotate in the second direction and the second head portion rotational component rotates in the first direction;
a rotational mechanism operably connected, or reversibly connectable, to the first neck portion rotational component; and,
a handle component operably connected, or connectable, to the head component, which handle component comprises a handle housing component that comprises a motor component operably connected, or reversibly connectable, to a power source and to the rotational mechanism such that when the motor component effects rotation of the rotational mechanism, the first neck portion rotational component, the first head portion rotational component, and the band component rotate in the first direction or in the second direction and the second head portion rotational component rotates in the second direction or in the first direction when the rotational mechanism is operably connected to the first neck portion rotational component.

2. The device of claim 1, wherein the second head portion rotational component comprises a pulley component.

3. The device of claim 1, wherein the band component comprises a plurality of at least partially spherical or substantially disk-shaped projections and wherein the first and second head portion rotational components and the first neck portion rotational component each comprise spherical or substantially disk-shaped projection receiving areas that are structured to receive at least portions of the spherical or substantially disk-shaped projections such that when the first neck portion rotational component rotates in a first direction, the band component and the first head portion rotational component rotate in the first direction and the second head portion rotational component rotates in the second direction or when the first neck portion rotational component rotates in a second direction, the band component and the first head portion rotational component rotate in the second direction and the second head portion rotational component rotates in the first direction when the spherical or substantially disk-shaped projection receiving areas receive at least the portions of the spherical or substantially disk-shaped projections and at least the spherical or substantially disk-shaped projections engage the first and second head portion rotational components and the first neck portion rotational component.

4. The device of claim 1, wherein the first and second head portion rotational components each comprise gear structures that mesh with one another when the first and second head portion rotational components rotate relative to one another.

5. The device of claim 1, wherein the first implement and the second implement are independently selected from the group consisting of: a prophy cup, a bristle component, a flossing component, a polishing component, and a combination of two or more thereof.

6. The device of claim 1, wherein the first implement and the second implement are independently selected from the group consisting of: a cleaning component, a polishing component, a sanding component, and a scrubbing component.

7. A head component, comprising:
a head housing component comprising a head portion and a neck portion that are operably connected to one another, wherein the head portion comprises at least a top area that comprises at least a first top opening and at least a second top opening;
a first head portion rotational component operably disposed at least partially in the head portion of the head housing component, wherein the first head portion rotational component is configured to rotate completely around a first head portion rotational axis, wherein the first head portion rotational component comprises at least a first implement, and wherein at least a segment of the first head portion rotational component extends at least partially into and/or through the first top opening of the head portion such that the first implement at least partially extends from the head portion;
a second head portion rotational component operably disposed at least partially in the head portion of the head housing component, wherein the second head portion rotational component is configured to rotate completely around a second head portion rotational axis, wherein the first head portion rotational axis and the second head portion rotational axis are different from one another, wherein the second head portion rotational component comprises at least a second implement, wherein at least a segment of the second head portion rotational component extends at least partially into and/or through the second top opening of the head portion such that the second implement at least partially extends from the head portion;
a first neck portion rotational component operably disposed at least proximal to the neck portion of the head housing component, wherein the first neck portion rotational component is configured to rotate completely around a first neck portion rotational axis; and,
a band component operably engaged with the first head portion rotational component and the first neck portion rotational component, and wherein the band component is further operably engaged with the second head portion rotational component and/or the first and second head portion rotational components operably engage one another, such that when the first neck portion rotational component rotates in a first direction, the band component and the first head portion rotational component rotate in the first direction and the second head portion rotational component rotates in a second direction or when the first neck portion rotational component rotates in the second direction, the band component and the first head portion rotational component rotate in the second direction and the second head portion rotational component rotates in the first direction;
wherein the first neck portion rotational component is operably connected, or reversibly connectable, to a rotational mechanism; and
wherein the head component is configured to reversibly operably connect to a handle component that comprises a handle housing component that comprises a motor component operably connected, or reversibly connectable, to a power source and to the rotational mechanism such that when the head component is operably connected to the handle component and when the motor component effects rotation of the rotational mechanism, the first neck portion rotational component, the first head portion rotational component, and the band component rotate in the first direction or in the second direction and the second head portion rotational component rotates in the second direction or in the first direction.

8. The head component of claim 7, wherein the second head portion rotational component comprises a pulley component.

9. The head component of claim 7, wherein the band component comprises a plurality of at least partially spherical or substantially disk-shaped projections, wherein the first and second head portion rotational components and the first neck portion rotational component each comprise spherical or substantially disk-shaped projection receiving areas that are structured to receive at least portions of the spherical or substantially disk-shaped projections such that when the first neck portion rotational component rotates in a first direction, the band component and the first head portion rotational component rotate in the first direction and the second head portion rotational component rotates in the second direction or when the first neck portion rotational component rotates in a second direction, the band component and the first head portion rotational component rotate in the second direction and the second head portion rotational component rotates in the first direction when the spherical or substantially disk-shaped projection receiving areas receive at least the portions of the spherical or substantially disk-shaped projections and at least the spherical or substantially disk-shaped projections engage the first and second head portion rotational components and the first neck portion rotational component.

10. The head component of claim 7, wherein the first and second head portion rotational components each comprise gear structures that mesh with one another when the first and second head portion rotational components rotate relative to one another.

11. The head component of claim 7, wherein the second head portion rotational component comprises at least a second head portion gear component operably connected to the second implement and wherein the band component is further operably engaged with the second head portion gear component and a first head portion gear component and/or the first and second head portion rotational components operably engage one another such that when the first neck portion rotational component rotates in the first direction, the band component and the first head portion rotational component rotate in the first direction and the second head portion rotational component rotates in the second direction or when the first neck portion rotational component rotates in the second direction, the band component and the first head portion rotational component rotate in the second direction and the second head portion rotational component rotates in the first direction.

12. The head component of claim 11, wherein the first direction and the second direction are substantially opposite one another.

13. The head component of claim 11, wherein a first surface of the band component comprises a first set of projections that engage with the first head portion gear component of the first head portion rotational component and the first neck portion gear component of the first neck portion rotational component and wherein a second surface of the band component comprises a second set of projections that engage with the second head portion gear component of the second head portion rotational component.

14. The head component of claim 11, wherein the first implement and the second implement are independently selected from the group consisting of: a prophy cup, a bristle component, a flossing component, a polishing component, and a combination of two or more thereof.

15. A method of operating a device, the method comprising rotating a first neck portion rotational component of the device, which first neck portion rotational component is operably engaged with a band component that is operably engaged with a first head portion rotational component that comprises at least a first implement such that the first head portion rotational component and the first implement rotate completely around a first head portion rotational axis in a first direction, and rotating a second head portion rotational component of the device, which second head portion rotational component comprises at least a second implement and which second head portion rotational component is operably engaged with the band component and/or the first and second head portion rotational components operably engage one another such that the second head portion rotational component and the second implement rotate completely around a second head portion rotational axis in a second direction, wherein the first head portion rotational axis and the second head portion rotational axis are different from one another, thereby operating the device.

16. The method of claim 15, wherein the first and second implements comprise dental implements and wherein the method further comprises contacting the first dental implement and/or the second dental implement with one or more teeth and/or dental appliances of a subject.

17. A device, comprising:
a head component that comprises:
a head housing component comprising a head portion and a neck portion that are operably connected to one another, wherein the head portion comprises at least a top area that comprises at least a first top opening and at least a second top opening;
a first head portion rotational component operably disposed at least partially in the head portion of the head housing component, wherein the first head portion rotational component is configured to rotate completely around a first head portion rotational axis, wherein the first head portion rotational component comprises at least a first implement, wherein the first head portion rotational component comprises at least a first head portion gear component operably connected to the first implement, and wherein at least a segment of the first head portion rotational component extends at least partially into and/or through the first top opening of the head portion such that the first implement at least partially extends from the head portion;
a second head portion rotational component operably disposed at least partially in the head portion of the head housing component, wherein the second head portion rotational component is configured to rotate completely around a second head portion rotational axis, wherein the first head portion rotational axis and the second head portion rotational axis are different from one another, wherein the second head portion rotational component comprises at least a second head portion gear component and at least a second implement that are operably connected to one another, wherein at least a segment of the second head portion rotational component extends at least partially into and/or through the second top opening of the head portion such that the second implement at least partially extends from the head portion;
a first neck portion rotational component operably disposed at least proximal to the neck portion of the head housing component, wherein the first neck portion rotational component is configured to rotate completely around a first neck portion rotational axis;
a band component operably engaged with the first head portion rotational component and the first neck portion rotational component, and wherein the band component is further operably engaged with the second head portion gear component and the first head portion gear component and/or the first and second head portion rotational components operably engage one another, such that when the first neck portion rotational component rotates in a first direction, the band component and the first head portion rotational component rotate in the first direction and the second head portion rotational component rotates in a second direction or when the first neck portion rotational component rotates in the second direction, the band component and the first head portion rotational component rotate in the second direction and the second head portion rotational component rotates in the first direction;
a rotational mechanism operably connected, or reversibly connectable, to the first neck portion rotational component; and,
a handle component operably connected, or connectable, to the head component, which handle component comprises a handle housing component that comprises a motor component operably connected, or reversibly connectable, to a power source and to the rotational mechanism such that when the motor component effects rotation of the rotational mechanism, the first neck portion rotational component, the first head portion rotational component, and the band component rotate in the first direction or in the second direction and the second head portion rotational component rotates in the second direction or in the first direction when the rotational mechanism is operably connected to the first neck portion rotational component.

18. The device of claim 17, wherein the first direction and the second direction are substantially opposite one another.

19. The device of claim 17, wherein a first surface of the band component comprises a first set of projections that engage with the first head portion gear component of the first head portion rotational component and the first neck portion gear component of the first neck portion rotational component and wherein a second surface of the band component comprises a second set of projections that engage with the second head portion gear component of the second head portion rotational component.

20. The device of claim 17, wherein the first head portion rotational component and/or the second head portion rotational component comprises at least one resilient coupling component that resiliently couples the first implement directly or indirectly to the first head portion gear component and/or the second implement directly or indirectly to the second head portion gear component.

* * * * *